US012506987B2

(12) United States Patent
Takatsuka et al.

(10) Patent No.: US 12,506,987 B2
(45) Date of Patent: Dec. 23, 2025

(54) IMAGING UNIT AND INFORMATION PROCESSING SYSTEM

(71) Applicant: SONY SEMICONDUCTOR SOLUTIONS CORPORATION, Kanagawa (JP)

(72) Inventors: Takafumi Takatsuka, Kanagawa (JP); Jun Ogi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 86 days.

(21) Appl. No.: 18/574,180

(22) PCT Filed: Mar. 11, 2022

(86) PCT No.: PCT/JP2022/011132
§ 371 (c)(1),
(2) Date: Dec. 26, 2023

(87) PCT Pub. No.: WO2023/276299
PCT Pub. Date: Jan. 5, 2023

(65) Prior Publication Data
US 2024/0323565 A1 Sep. 26, 2024

(30) Foreign Application Priority Data
Jul. 1, 2021 (JP) .................................. 2021-110226

(51) Int. Cl.
*H04N 25/768* (2023.01)
*H04N 25/616* (2023.01)
(Continued)

(52) U.S. Cl.
CPC ......... *H04N 25/768* (2023.01); *H04N 25/616* (2023.01)

(58) Field of Classification Search
CPC .... H04N 25/616; H04N 25/768; H04N 25/60; H04N 25/75; H04N 25/78; H04N 25/79;
(Continued)

(56) References Cited

U.S. PATENT DOCUMENTS

2020/0252563 A1* 8/2020 Yasuda ................ H04N 25/704
2022/0295000 A1* 9/2022 Yamazaki ............ H04N 25/772
(Continued)

FOREIGN PATENT DOCUMENTS

| JP | 2011-232259 A | 11/2011 |
|---|---|---|
| JP | 2018-061079 A | 4/2018 |

(Continued)

OTHER PUBLICATIONS

International Search Report and Written Opinion of PCT Application No. PCT/JP2022/011132, issued on May 24, 2022, 08 pages of ISRWO.

*Primary Examiner* — Marly S Camargo
(74) *Attorney, Agent, or Firm* — CHIP LAW GROUP

(57) ABSTRACT

An imaging unit according to one aspect of the present disclosure includes a plurality of pixels disposed in a matrix form, and a controller that performs TDI control on the plurality of pixels. Each of the pixels includes a light pulse responder and a counter section. The light pulse responder generates a light pulse in response to incidence of light. The counter section includes a rewrite circuit and an adder circuit. The rewrite circuit rewrites an initial value. The adder circuit adds information corresponding to the light pulse to the initial value. The controller causes information held in the counter section to be written as the initial value into the counter section included in the pixel of a next stage in a column direction, and thereafter causes the information corresponding to the light pulse obtained from the light pulse responder to be added to the initial value.

27 Claims, 29 Drawing Sheets

(51) Int. Cl.
*H04N 25/773* (2023.01)
*H10F 30/225* (2025.01)
*H10F 39/15* (2025.01)

(58) Field of Classification Search
CPC . H04N 25/773; H10F 39/1538; H10F 30/225; H10F 77/959
See application file for complete search history.

(56) References Cited

U.S. PATENT DOCUMENTS

2024/0065010 A1* 2/2024 Keino ................. H10F 39/1538
2024/0430591 A1* 12/2024 Makida ................. H04N 25/79

FOREIGN PATENT DOCUMENTS

| JP | 2020-127122 A | 8/2020 |
| JP | 2021-034862 A | 3/2021 |

* cited by examiner

[ FIG. 1 ]
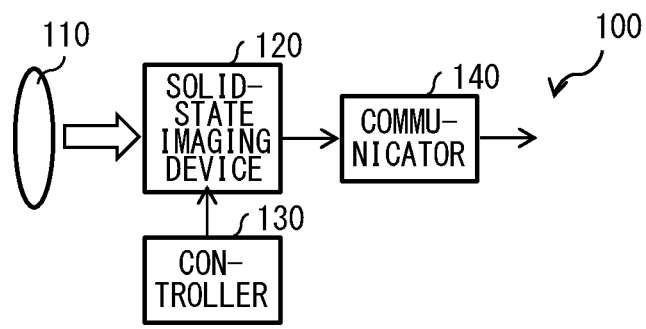
[ FIG. 2 ]
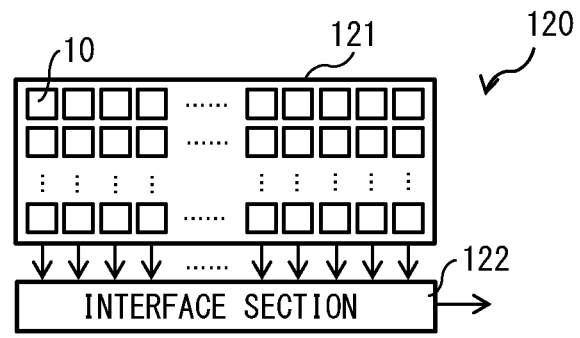

[ FIG. 3 ]
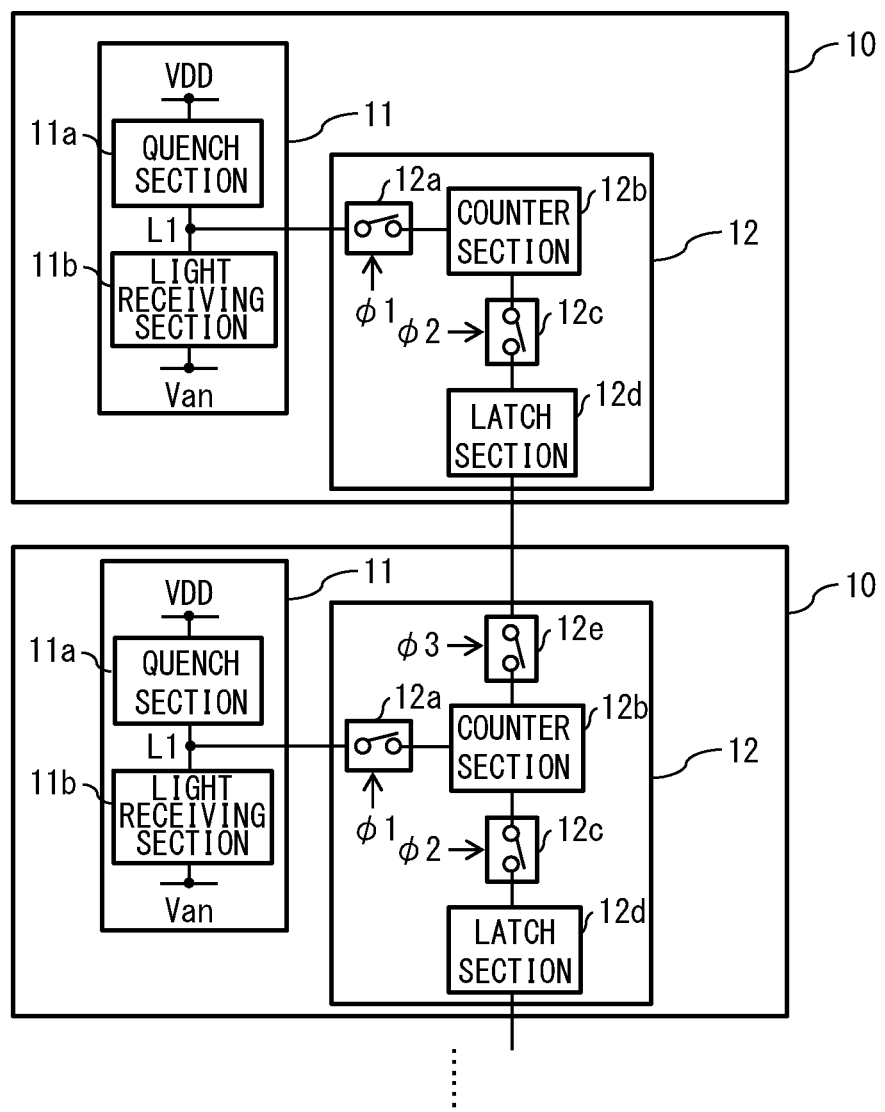

[FIG. 4]
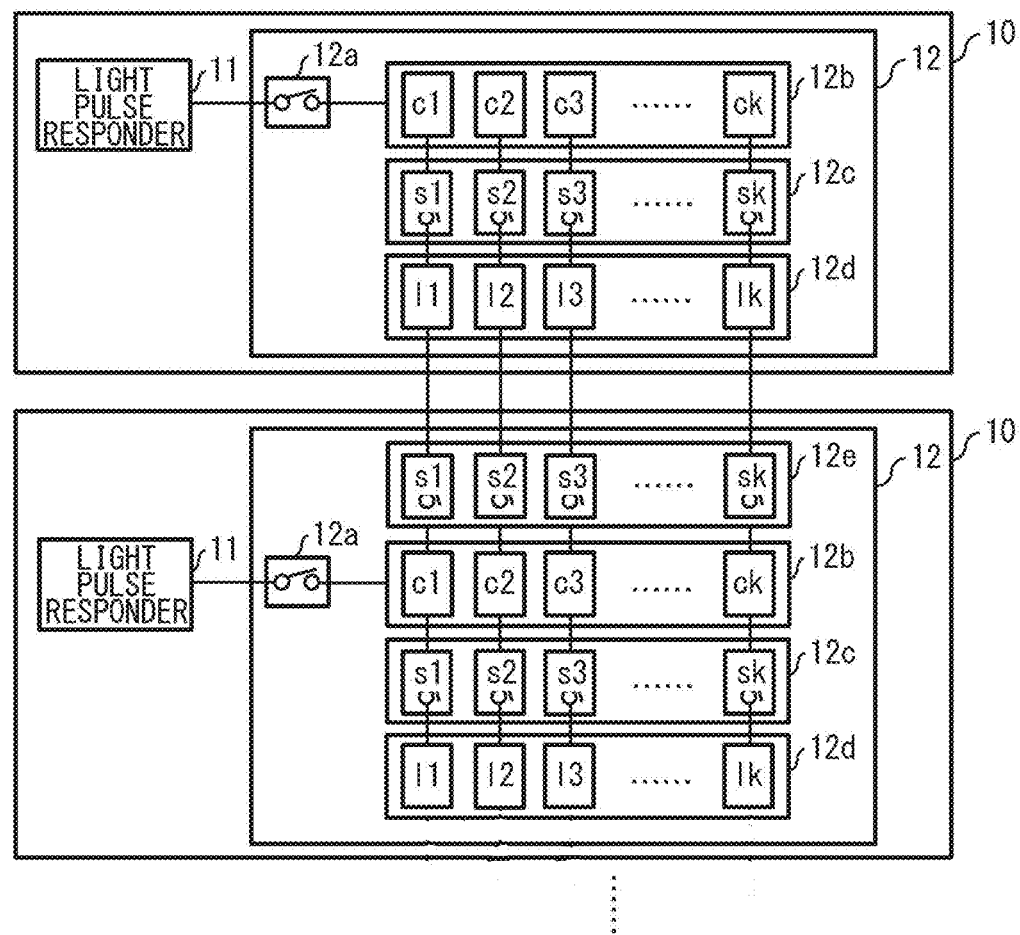

[ FIG. 5 ]
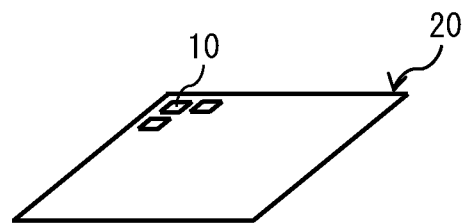
[ FIG. 6 ]
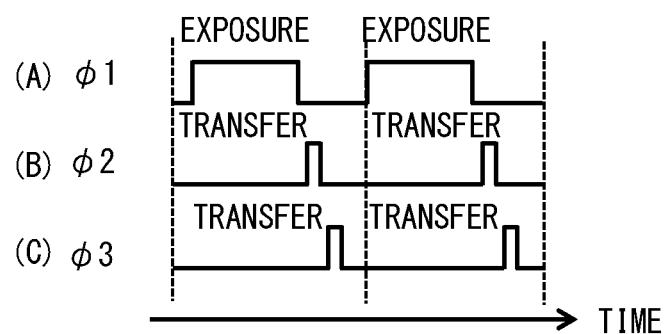

[ FIG. 7 ]
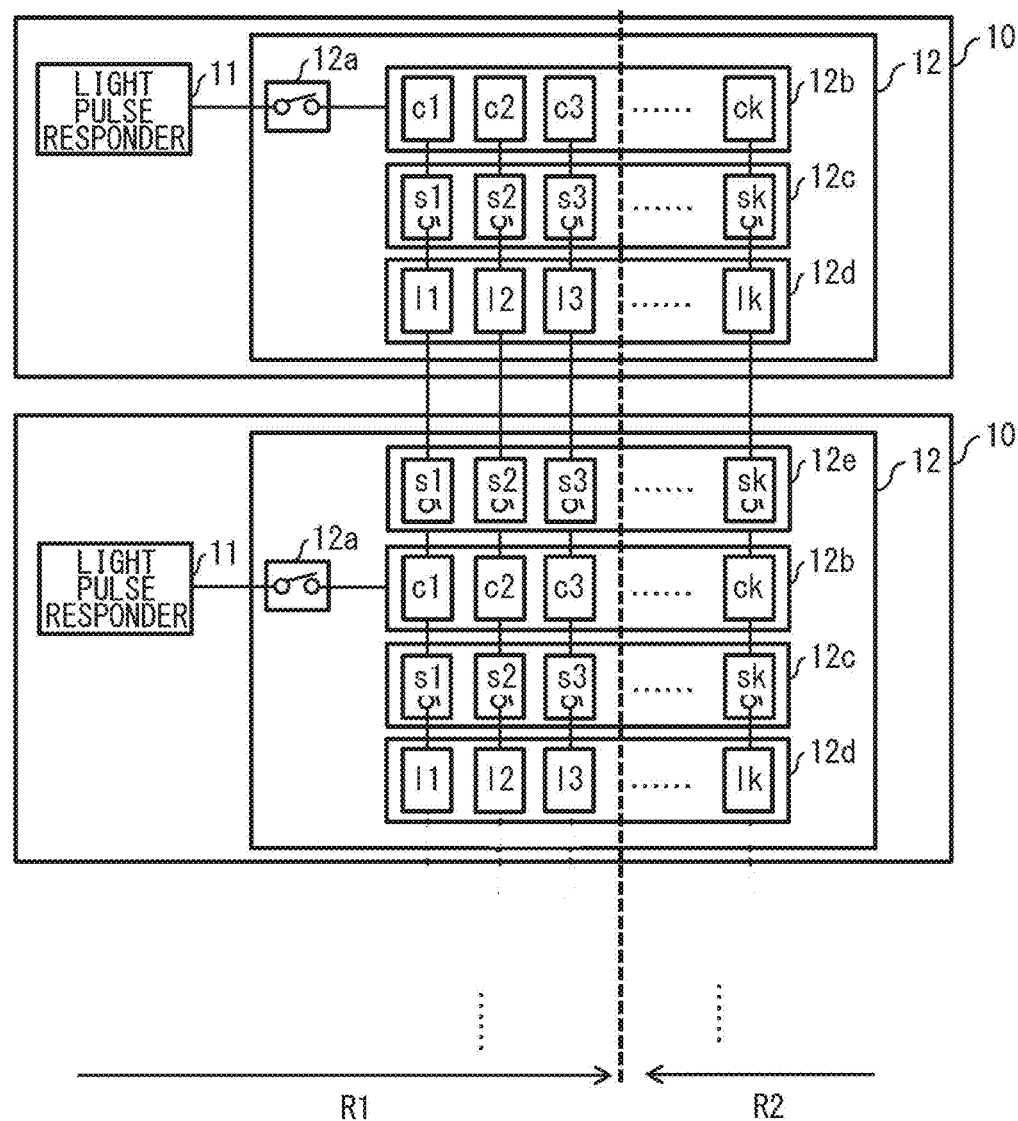

[ FIG. 8 ]
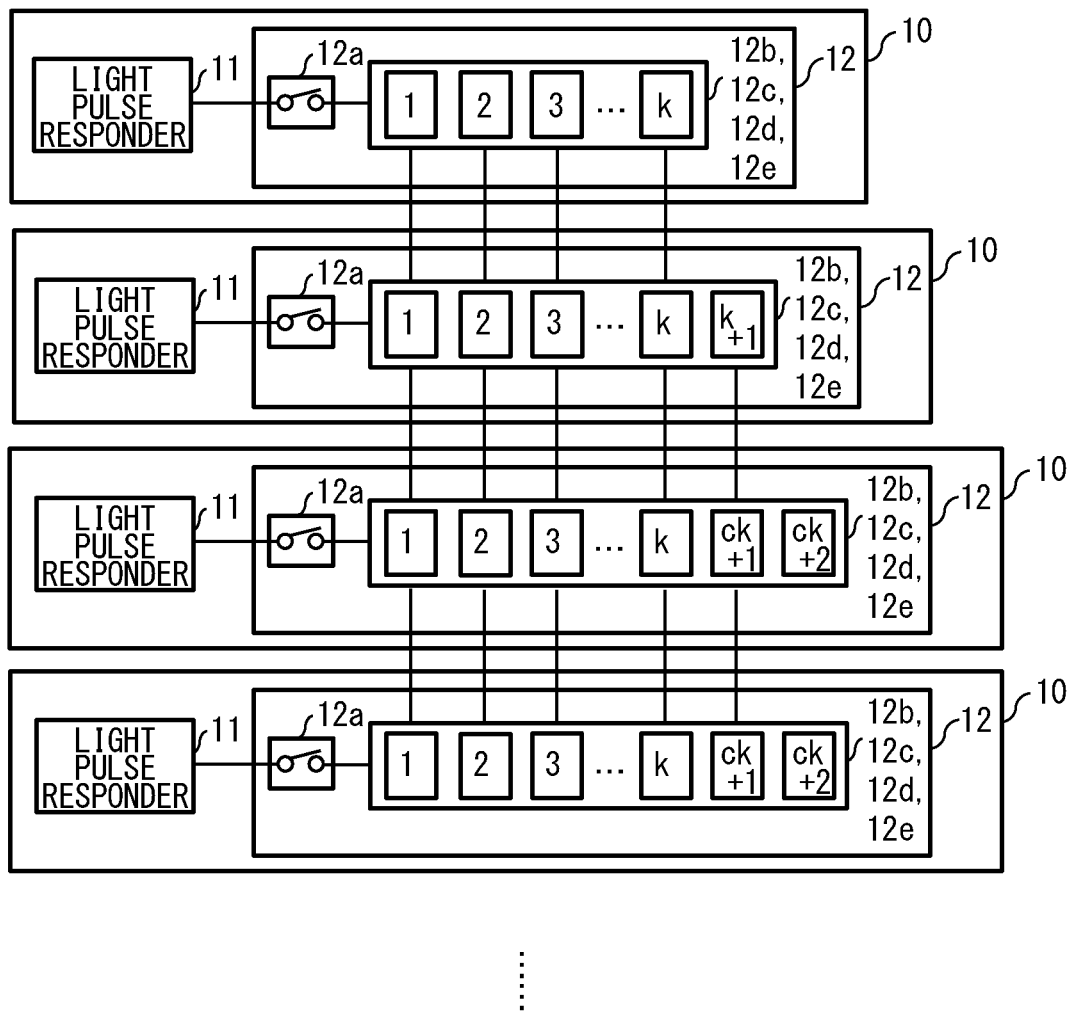

[ FIG. 9 ]
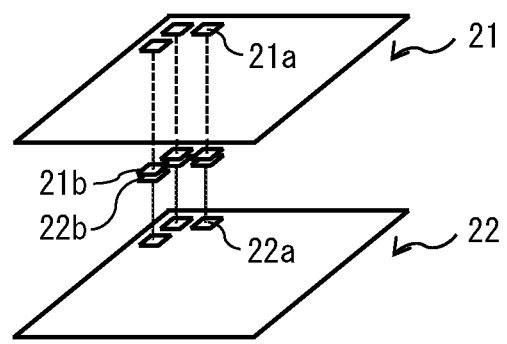

[ FIG. 10 ]
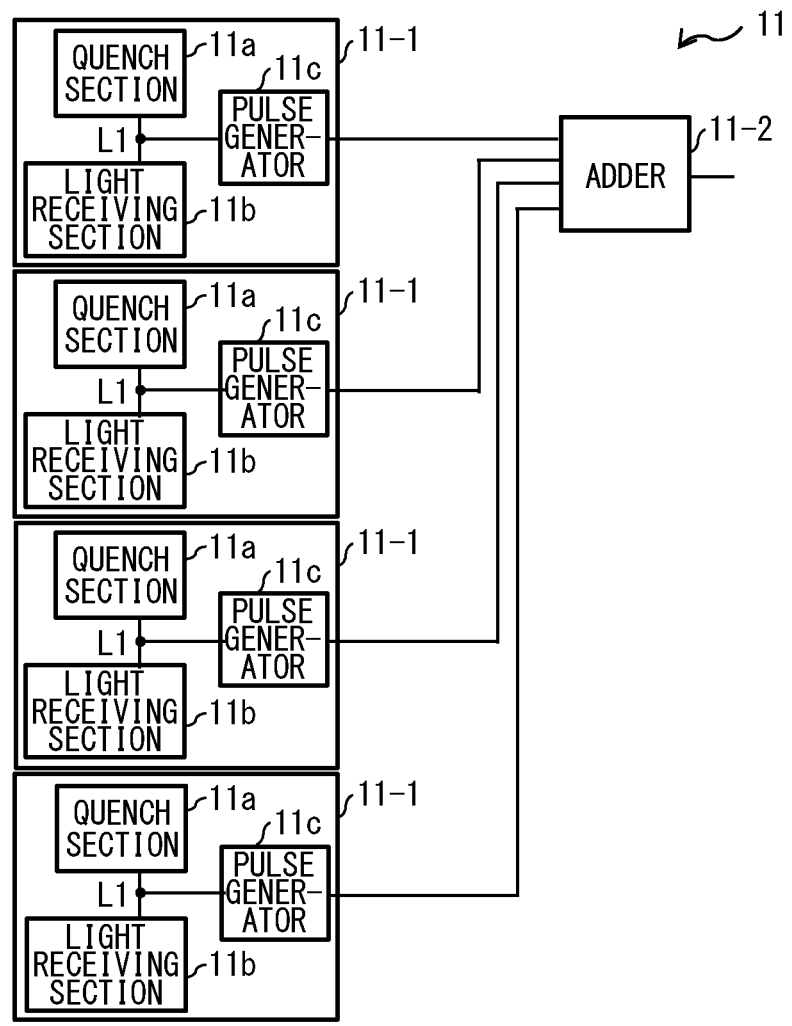

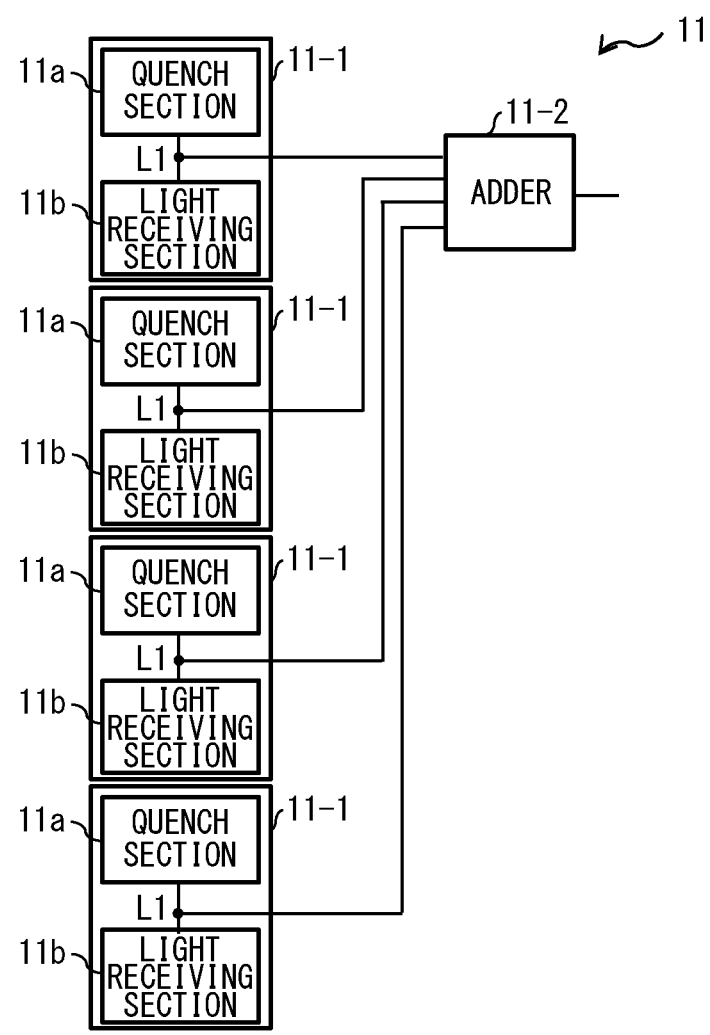
[ FIG. 11 ]

[ FIG. 12 ]
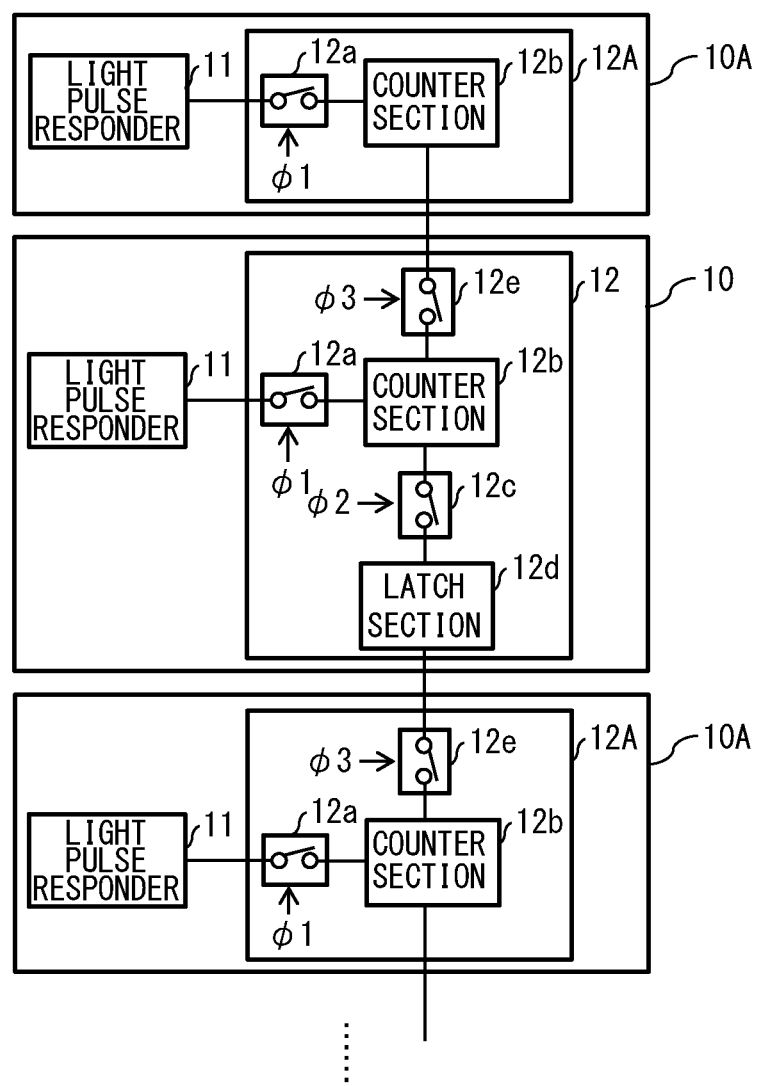

[FIG. 13]
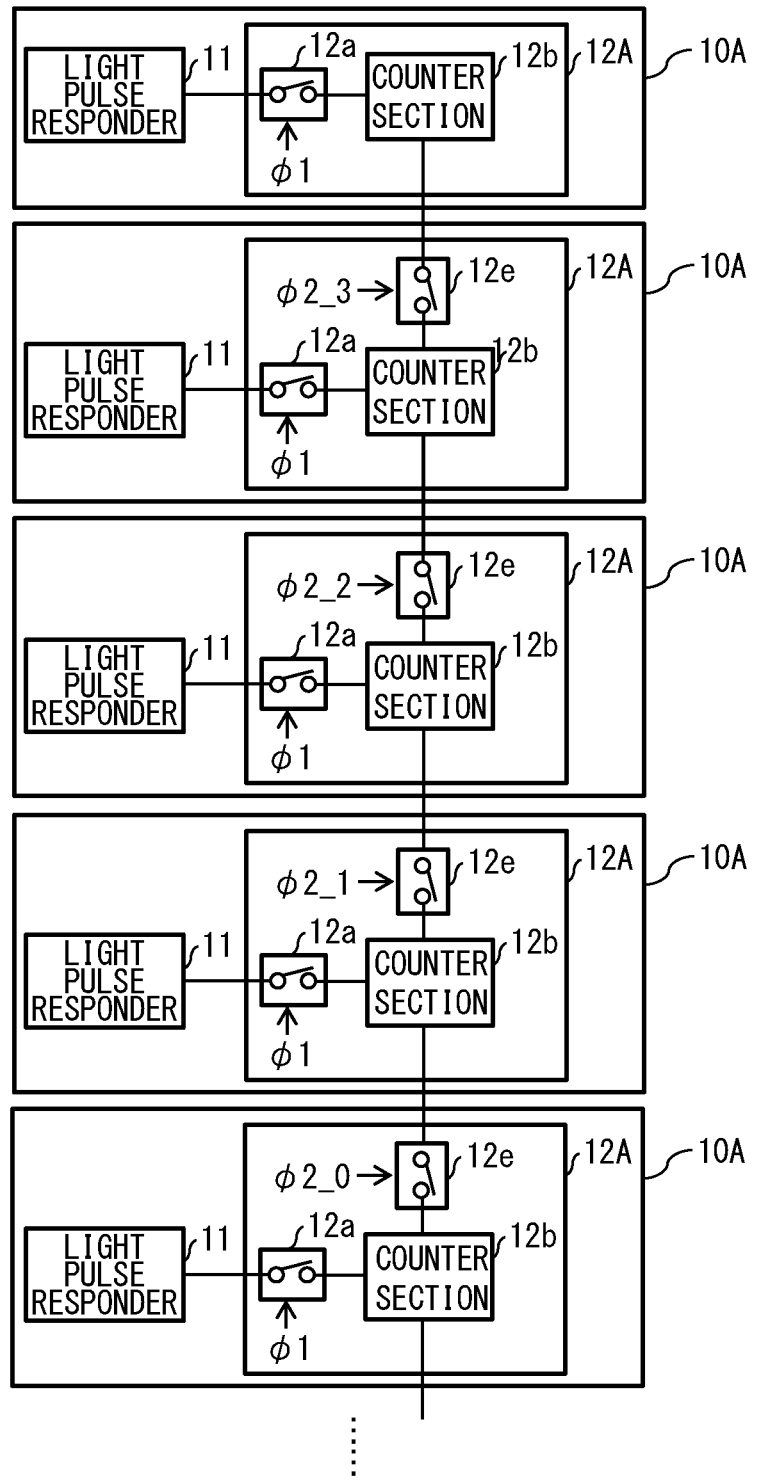

[ FIG. 14 ]
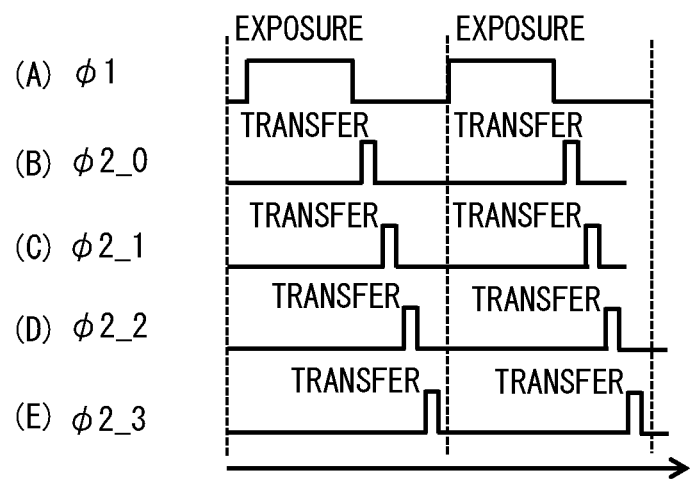

[ FIG. 15 ]
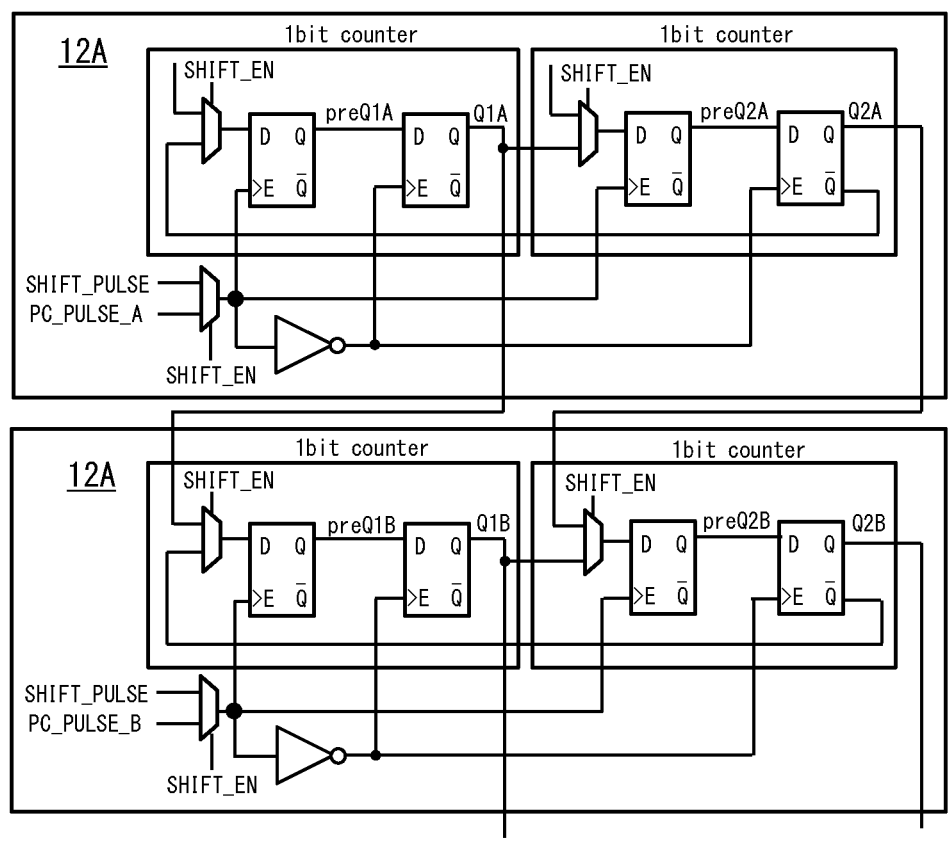

[ FIG. 16 ]
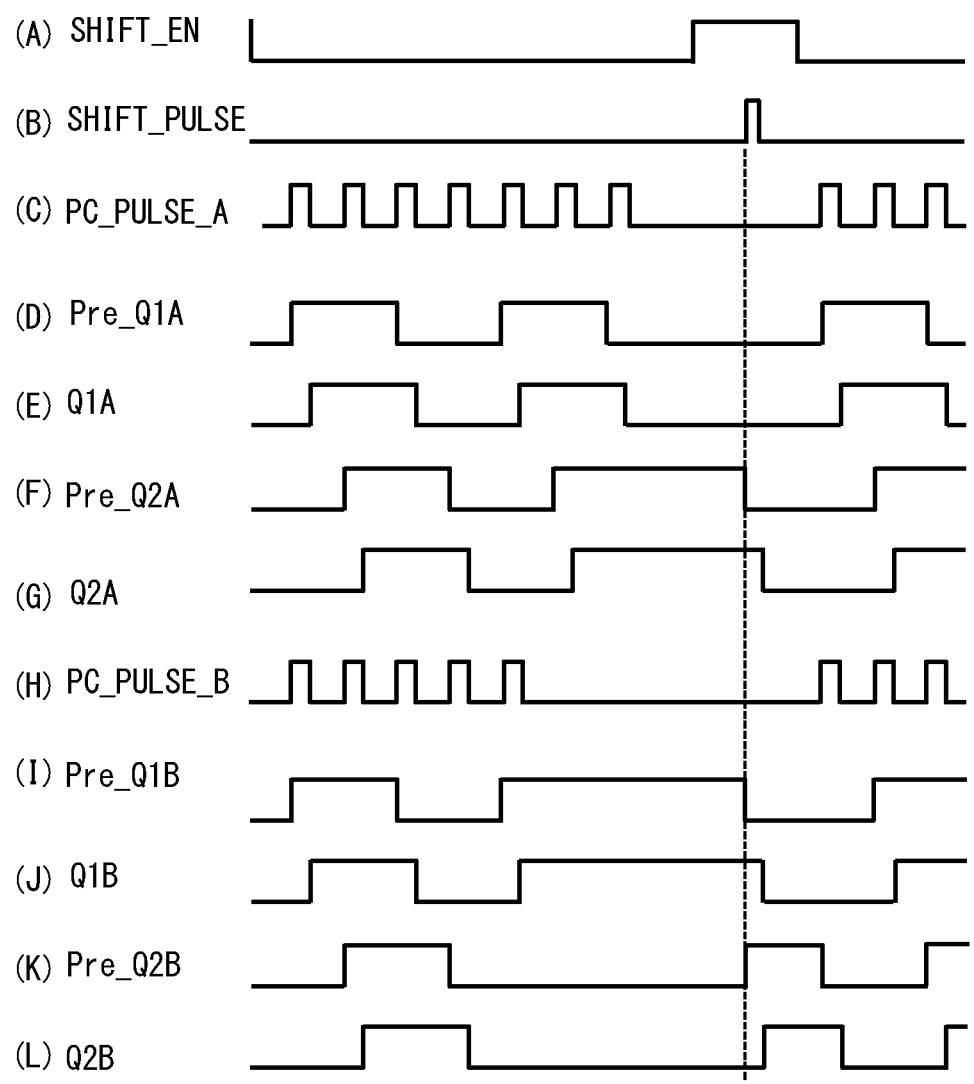

[ FIG. 17 ]
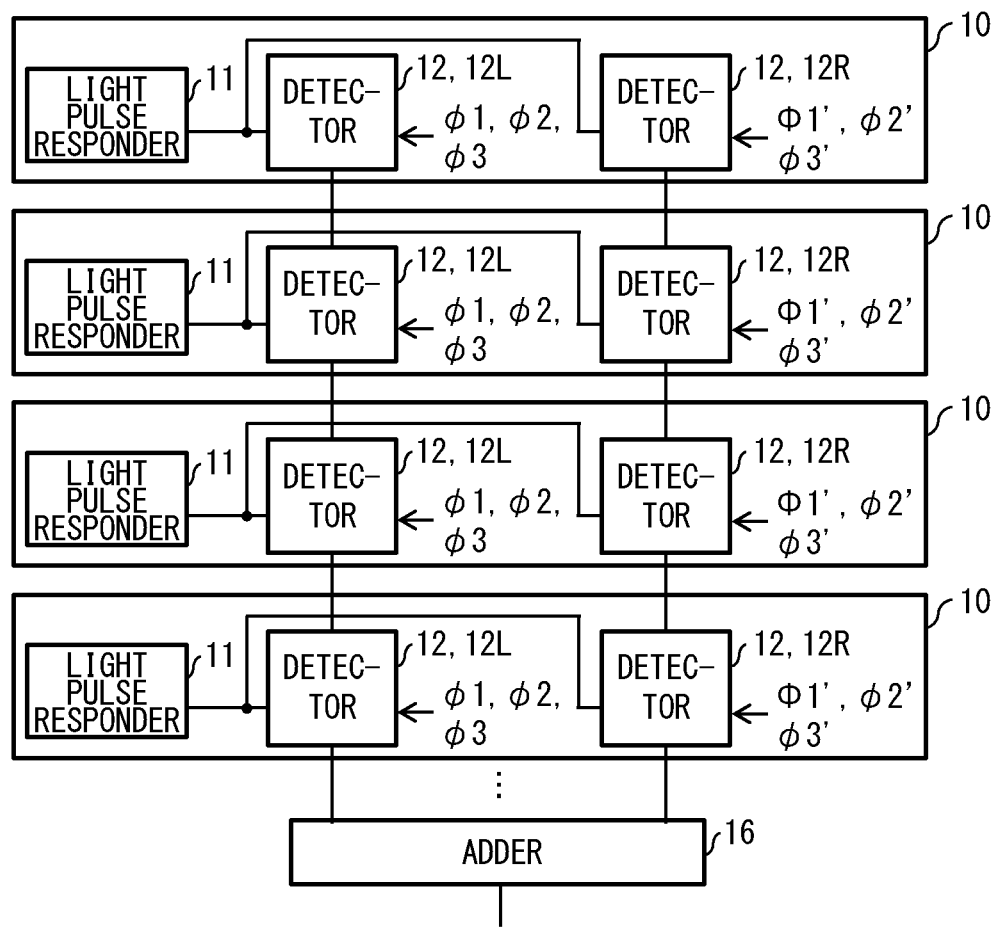

[ FIG. 18 ]
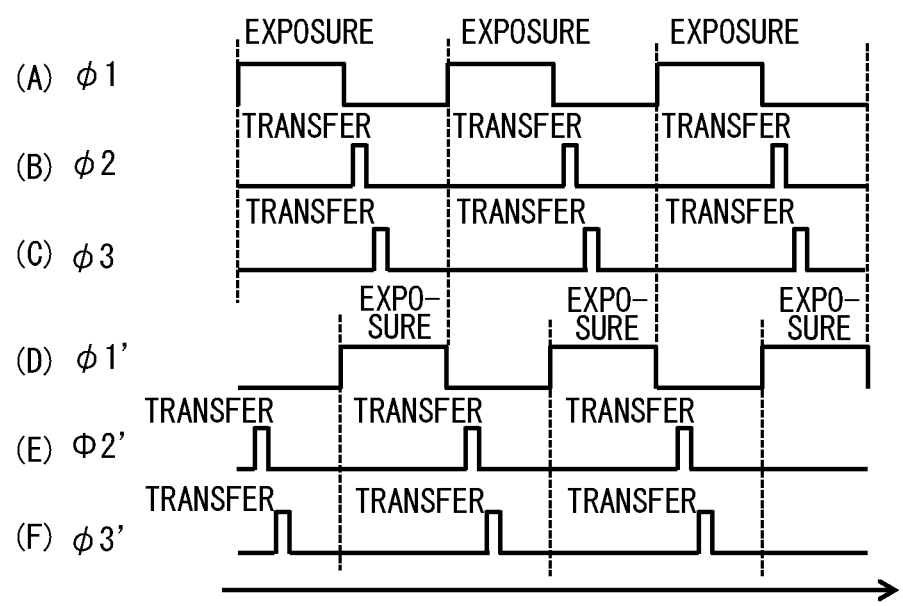

[ FIG. 19 ]
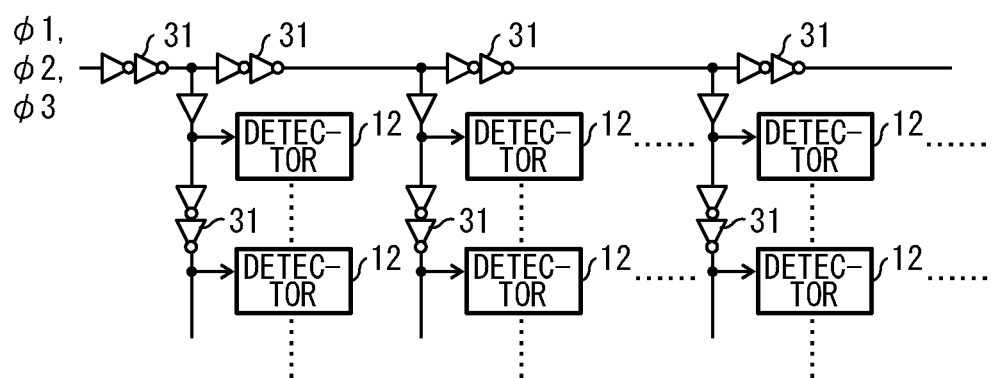
[ FIG. 20 ]
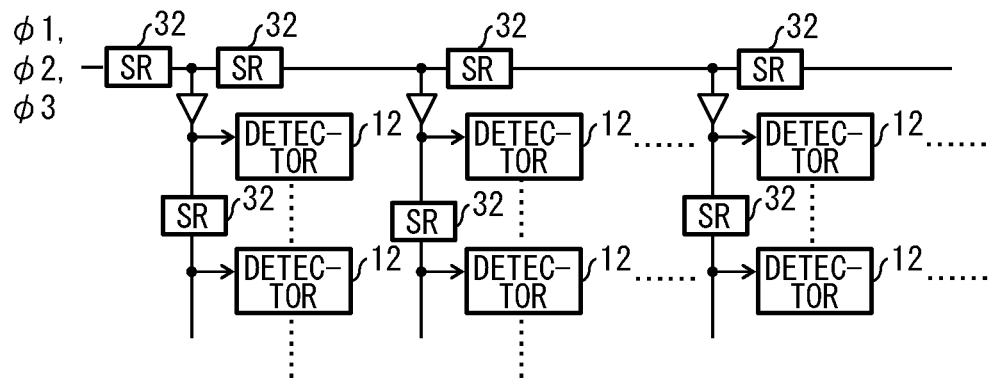

[ FIG. 21 ]
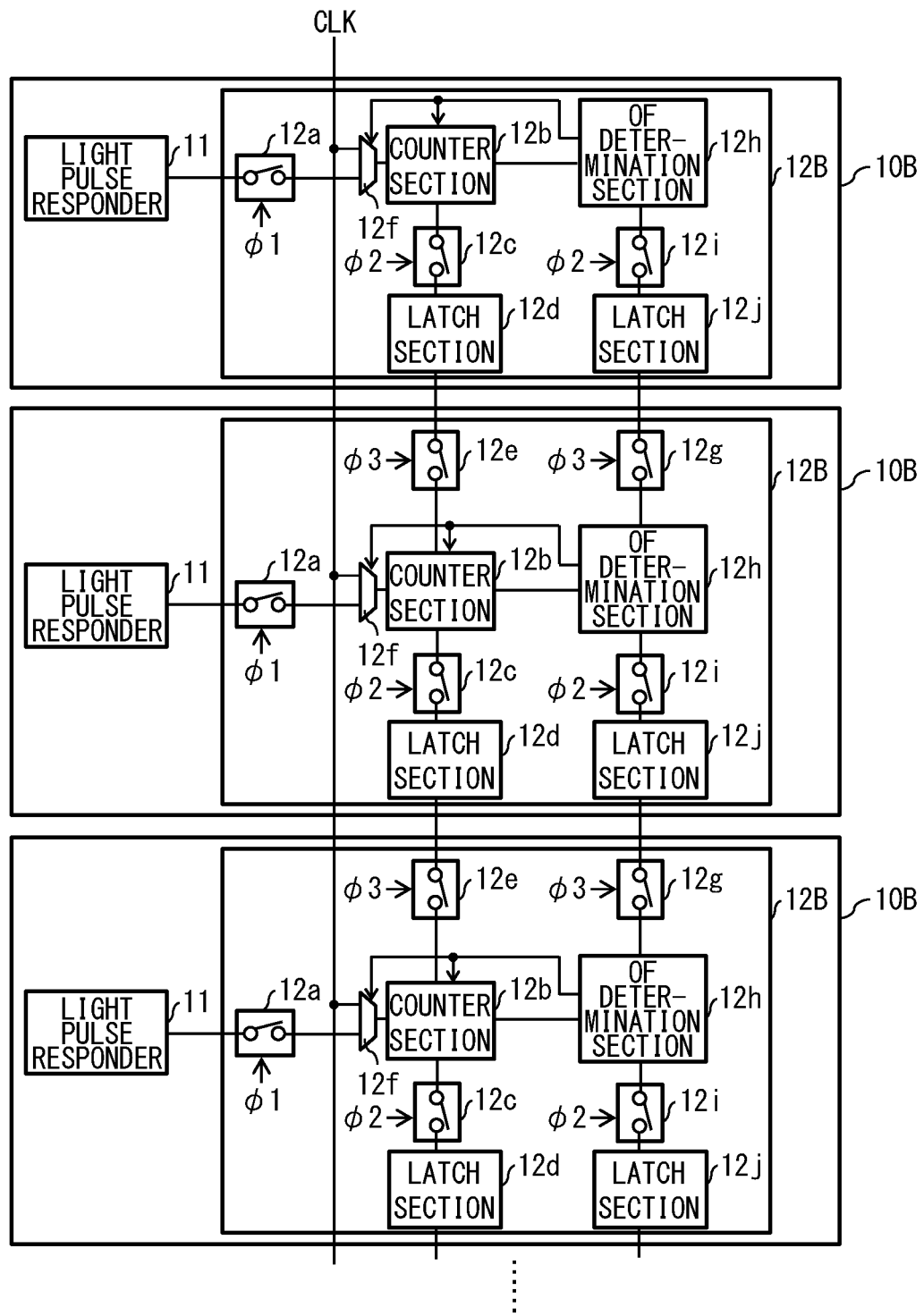

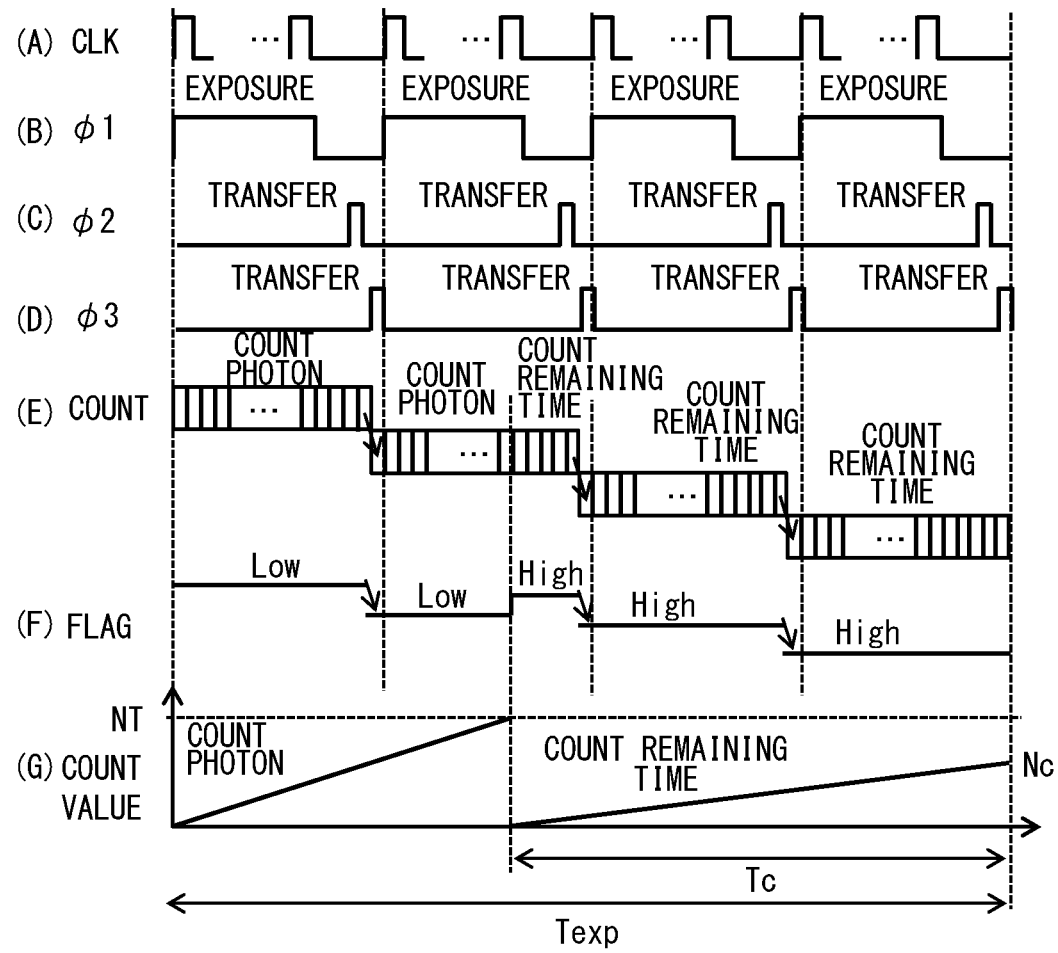

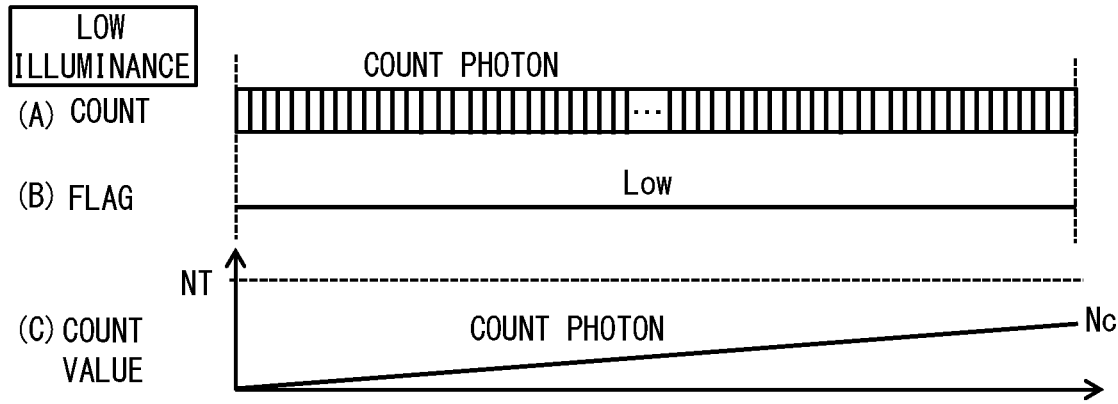
[ FIG. 23 ]
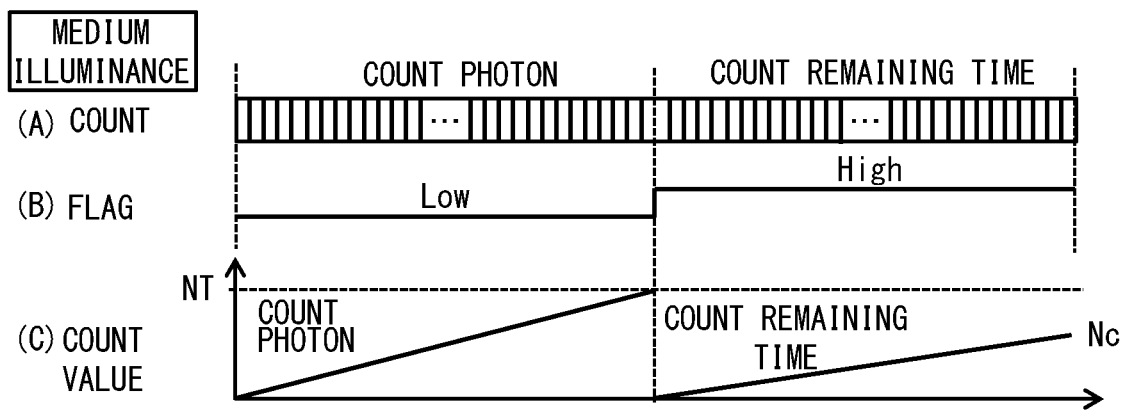
[ FIG. 24 ]
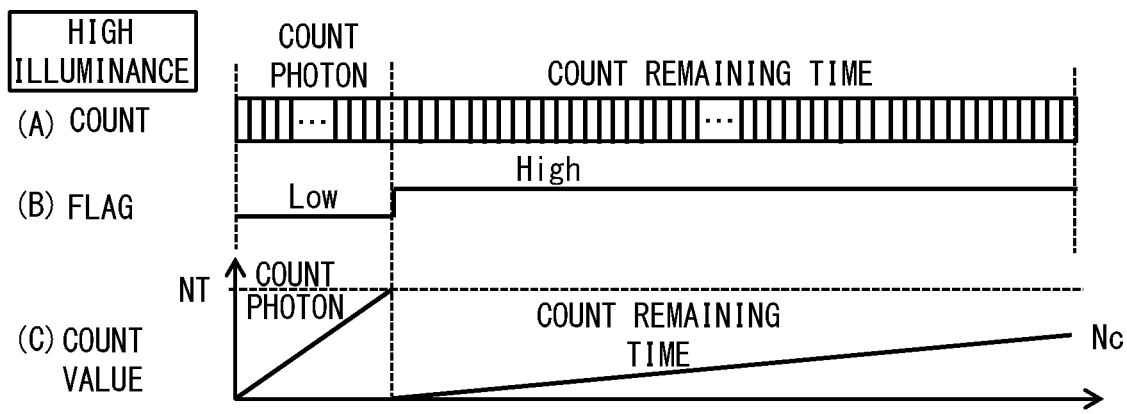
[ FIG. 25 ]

[FIG. 26]
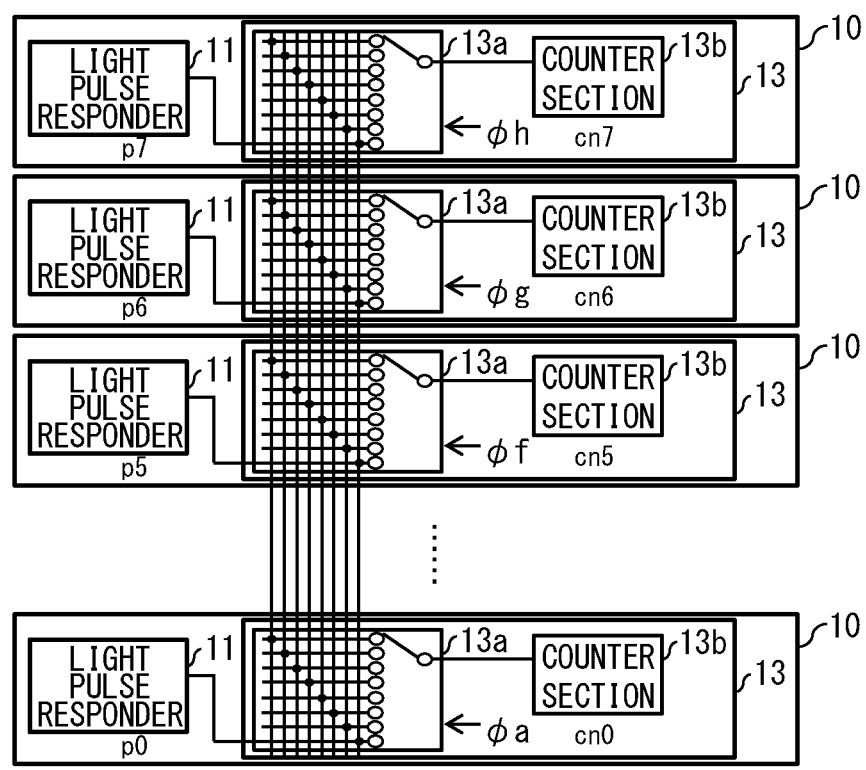

[ FIG. 27 ]

DATA PATTERN

| pixel | H1 | H2 | H3 | H4 | H5 | H6 | H7 | H8 | H9 | H10 | H11 | H12 | H13 | H14 | H15 | H16 |
|---|---|---|---|---|---|---|---|---|---|---|---|---|---|---|---|---|
| p7 | H | I | J | K | L | M | N | O | P | Q | R | S | T | U | V | W |
| p6 | G | H | I | J | K | L | M | N | O | P | Q | R | S | T | U | V |
| p5 | F | G | H | I | J | K | L | M | N | O | P | Q | R | S | T | U |
| p4 | E | F | G | H | I | J | K | L | M | N | O | P | Q | R | S | T |
| p3 | D | E | F | G | H | I | J | K | L | M | N | O | P | Q | R | S |
| p2 | C | D | E | F | G | H | I | J | K | L | M | N | O | P | Q | R |
| p1 | B | C | D | E | F | G | H | I | J | K | L | M | N | O | P | Q |
| p0 | A | B | C | D | E | F | G | H | I | J | K | L | M | N | O | P |

[ FIG. 28 ]

SWITCHING

| counter | H1 | H2 | H3 | H4 | H5 | H6 | H7 | H8 | H9 | H10 | H11 | H12 | H13 | H14 | H15 | H16 |
|---|---|---|---|---|---|---|---|---|---|---|---|---|---|---|---|---|
| cn7 | p7 | p6 | p5 | p4 | p3 | p2 | p1 | p0 | p7 | p6 | p5 | p4 | p3 | p2 | p1 | p0 |
| cn6 | p6 | p5 | p4 | p3 | p2 | p1 | p0 | p7 | p6 | p5 | p4 | p3 | p2 | p1 | p0 | p7 |
| cn5 | p5 | p4 | p3 | p2 | p1 | p0 | p7 | p6 | p5 | p4 | p3 | p2 | p1 | p0 | p7 | p6 |
| cn4 | p4 | p3 | p2 | p1 | p0 | p7 | p6 | p5 | p4 | p3 | p2 | p1 | p0 | p7 | p6 | p5 |
| cn3 | p3 | p2 | p1 | p0 | p7 | p6 | p5 | p4 | p3 | p2 | p1 | p0 | p7 | p6 | p5 | p4 |
| cn2 | p2 | p1 | p0 | p7 | p6 | p5 | p4 | p3 | p2 | p1 | p0 | p7 | p6 | p5 | p4 | p3 |
| cn1 | p1 | p0 | p7 | p6 | p5 | p4 | p3 | p2 | p1 | p0 | p7 | p6 | p5 | p4 | p3 | p2 |
| cn0 | p0 | p7 | p6 | p5 | p4 | p3 | p2 | p1 | p0 | p7 | p6 | p5 | p4 | p3 | p2 | p1 |

[ FIG. 29 ]

DATA OUTPUT

| counter | H1 | H2 | H3 | H4 | H5 | H6 | H7 | H8 | H9 | H10 | H11 | H12 | H13 | H14 | H15 | H16 |
|---|---|---|---|---|---|---|---|---|---|---|---|---|---|---|---|---|
| cn7 | H | H | H | H | H | H | H | P | P | P | P | P | P | P | P | P |
| cn6 | G | G | I | J | K | L | G | O | O | O | O | O | O | O | O | W |
| cn5 | F | F | H | I | J | F | N | N | N | N | N | N | N | N | V | V |
| cn4 | E | E | E | E | M | M | M | M | M | M | M | M | U | U | U | U |
| cn3 | D | D | D | D | L | L | L | L | L | L | L | L | T | T | T | T |
| cn2 | C | C | C | K | K | K | K | K | L | K | S | S | S | S | S | S |
| cn1 | B | B | J | J | J | J | J | J | J | R | R | R | R | R | R | R |
| cn0 | A | I | I | I | I | I | I | I | Q | Q | Q | Q | Q | Q | Q | Q |

ADDITION →

[ FIG. 30 ]
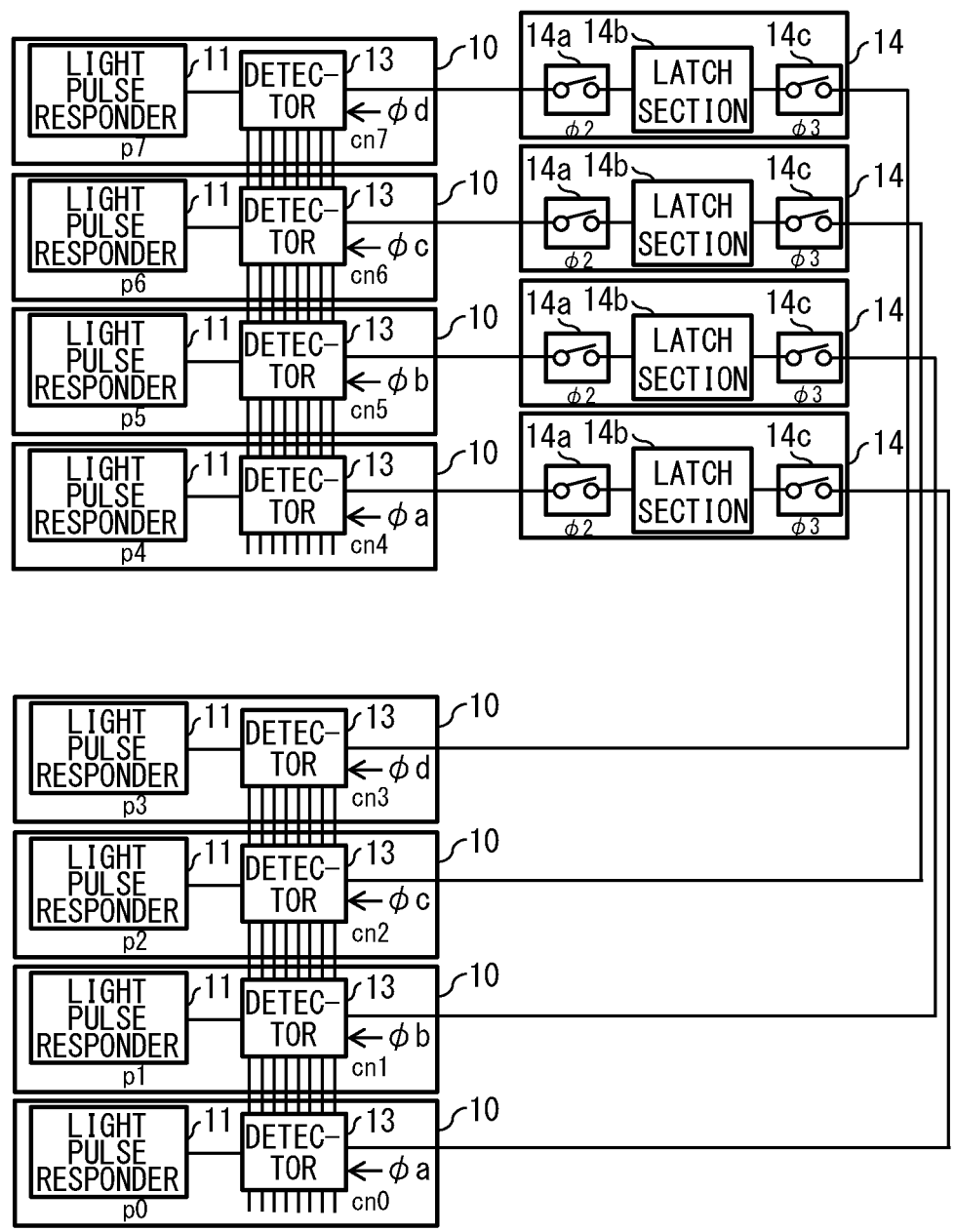

[ FIG. 31 ]

SWITCHING →

| counter | H1 | H2 | H3 | H4 | H5 | H6 | H7 | H8 | H9 | H10 | H11 | H12 | H13 | H14 | H15 | H16 |
|---|---|---|---|---|---|---|---|---|---|---|---|---|---|---|---|---|
| cn7 | p7 | p6 | p5 | p4 | p7 | p6 | p5 | p4 | p7 | p6 | p5 | p4 | p7 | p6 | p5 | p4 |
| cn6 | p6 | p5 | p4 | p7 | p6 | p5 | p4 | p7 | p6 | p5 | p4 | p7 | p6 | p5 | p4 | p7 |
| cn5 | p5 | p4 | p7 | p6 | p5 | p4 | p7 | p6 | p5 | p4 | p7 | p6 | p5 | p4 | p7 | p6 |
| cn4 | p4 | p7 | p6 | p5 | p4 | p7 | p6 | p5 | p4 | p7 | p6 | p5 | p4 | p7 | p6 | p5 |
| cn3 | p3 | p2 | p1 | p0 | p3 | p2 | p1 | p0 | p3 | p2 | p1 | p0 | p3 | p2 | p1 | p0 |
| cn2 | p2 | p1 | p0 | p3 | p2 | p1 | p0 | p3 | p2 | p1 | p0 | p3 | p2 | p1 | p0 | p3 |
| cn1 | p1 | p0 | p3 | p2 | p1 | p0 | p3 | p2 | p1 | p0 | p3 | p2 | p1 | p0 | p3 | p2 |
| cn0 | p0 | p3 | p2 | p1 | p0 | p3 | p2 | p1 | p0 | p3 | p2 | p1 | p0 | p3 | p2 | p1 |

[ FIG. 32 ]

DATA OUTPUT

| counter | H1 | H2 | H3 | H4 | H5 | H6 | H7 | H8 | H9 | H10 | H11 | H12 | H13 | H14 | H15 | H16 |
|---|---|---|---|---|---|---|---|---|---|---|---|---|---|---|---|---|
| cn7 | H | H | H | H | L | L | L | P | P | P | P | T | T | T | T | T |
| cn6 | G | G | G | K | K | K | K | O | O | O | O | S | S | S | S | W |
| cn5 | F | F | J | J | J | J | N | N | N | N | R | R | R | R | V | V |
| cn4 | E | I | I | I | I | M | M | M | M | Q | Q | Q | Q | U | U | U |
| cn3 | D | D | D | D | H | H | H | H | L | L | L | L | P | P | P | R |
| cn2 | C | C | C | G | G | G | G | K | K | K | K | O | O | O | O | S |
| cn1 | B | B | F | F | F | F | J | J | J | J | N | N | N | N | R | R |
| cn0 | A | E | E | E | E | I | I | I | I | M | M | M | M | Q | Q | Q |

[ FIG. 33 ]
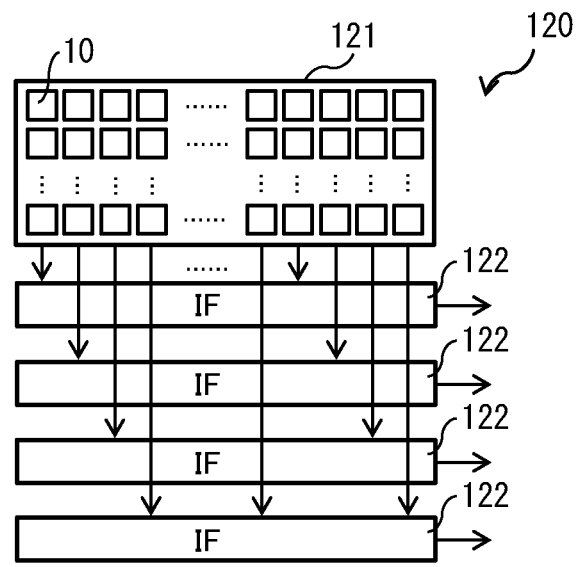
[ FIG. 34 ]
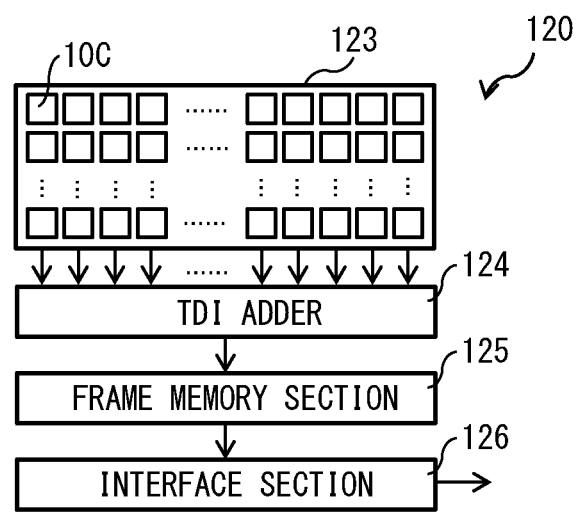

[ FIG. 35 ]
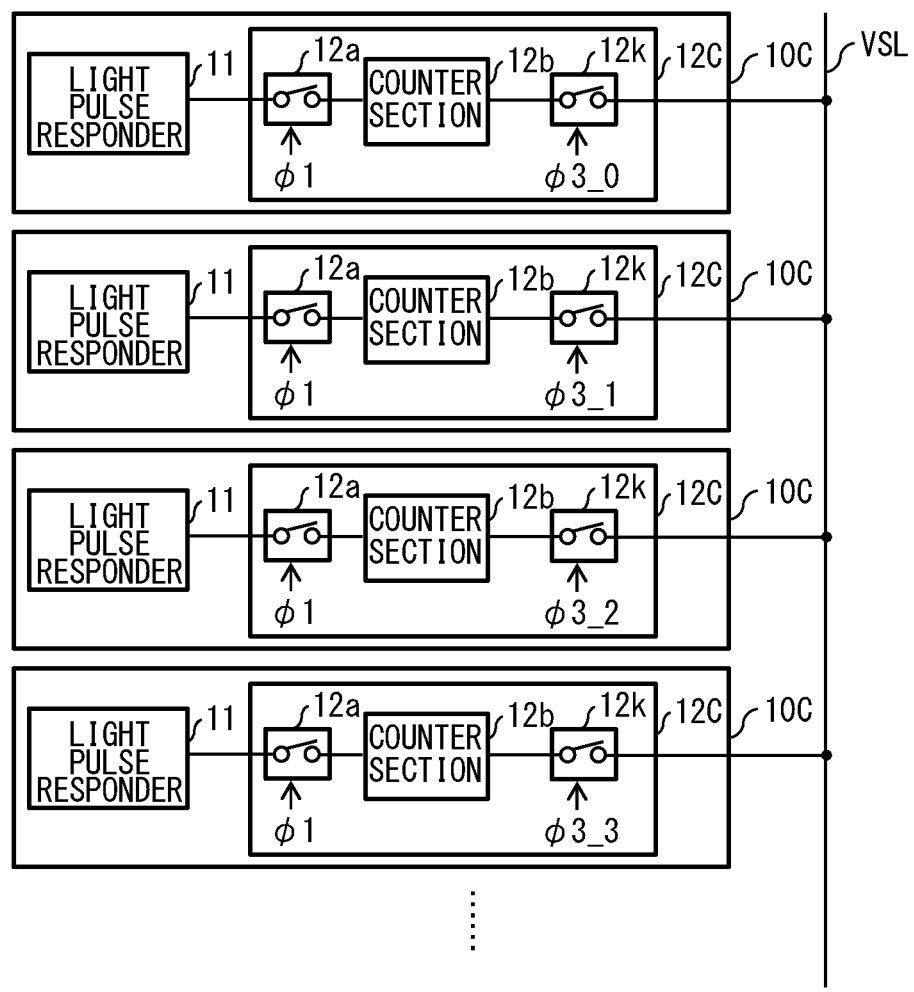

[ FIG. 36 ]
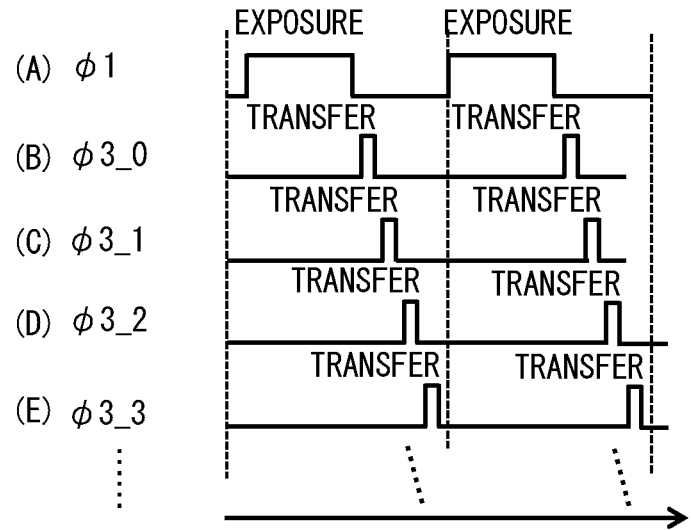
[ FIG. 37 ]
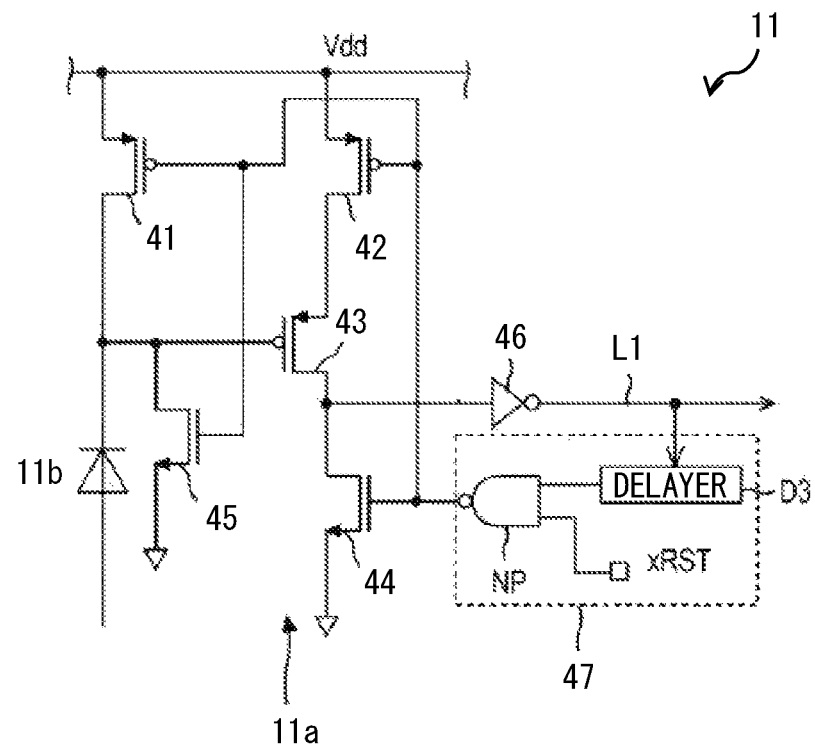

[ FIG. 38 ]
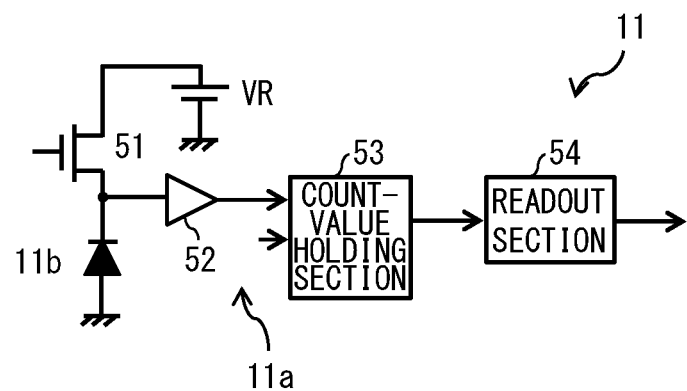
[ FIG. 39 ]
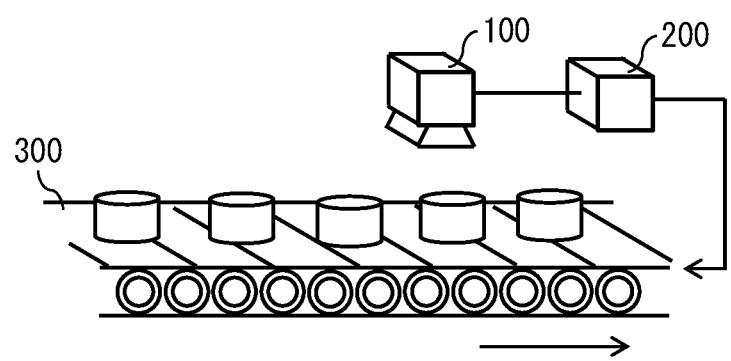

[ FIG. 40 ]
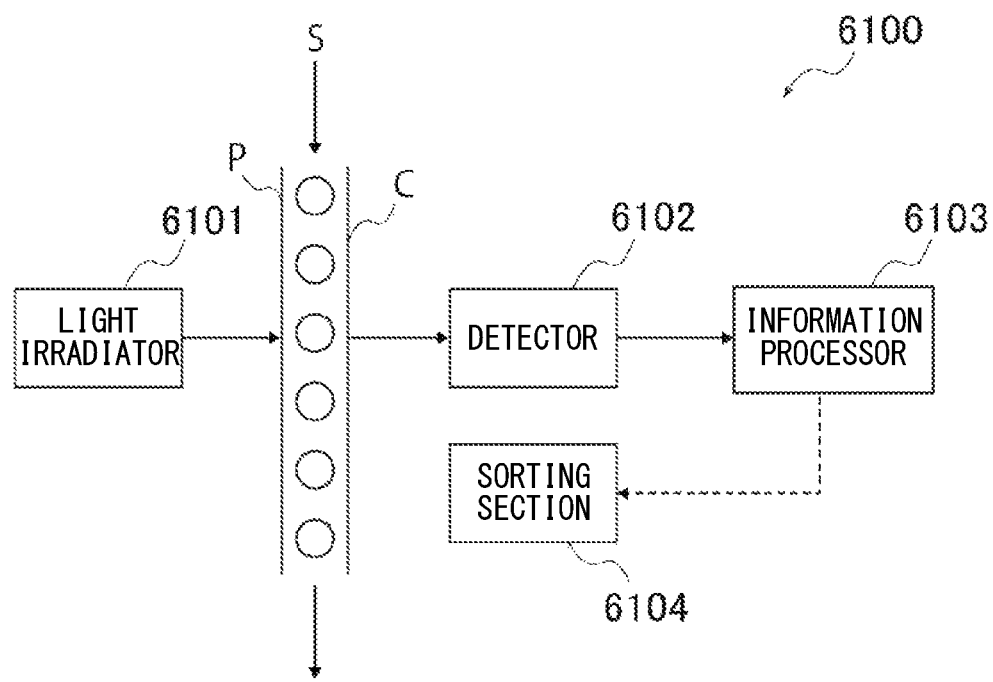

IMAGING UNIT AND INFORMATION PROCESSING SYSTEM

CROSS REFERENCE TO RELATED APPLICATIONS

This application is a U.S. National Phase of International Patent Application No. PCT/JP2022/011132 filed on Mar. 11, 2022, which claims priority benefit of Japanese Patent Application No. JP 2021-110226 filed in the Japan Patent Office on Jul. 1, 2021. Each of the above-referenced applications is hereby incorporated herein by reference in its entirety.

TECHNICAL FIELD

The present disclosure relates to an imaging unit and an information processing system that each perform a TDI (Time Delay Integration: linear time delay integration) process.

BACKGROUND ART

TDI sensors have been used in the fields of FA (Factory Automation), aerial shoot, and medical care. The TDI sensors are sensors that perform a TDI process of integrating an amount of electric charge while shifting times in accordance with a moving speed of a subject. For example, a TDI sensor including a CMOS (Complementary Metal Oxide Semiconductor) is described in a literature such as Patent Literature 1 below.

CITATION LIST

Patent Literature

Patent Literature 1: Japanese Unexamined Patent Application Publication No. 2021-34862

SUMMARY OF THE INVENTION

Incidentally, in existing TDI sensors, an AD conversion process or a correlated double sampling (Correlated Double Sampling: CDS) process is performed and a line rate is thus restricted by the AD conversion time or the CDS process time. As a result, an upper limit of the line rate is limited to about several 100 kHz. Further, the CDS process necessitates a frame memory, which makes it difficult to reduce a chip cost. It is therefore desirable to provide an imaging unit and an information processing system that each necessitate neither the AD conversion process nor the CDS process.

An imaging unit according to a first aspect of the present disclosure includes a plurality of pixels disposed in a matrix form, and a controller that performs TDI control on the plurality of pixels. Each of the pixels includes a light pulse responder and a counter section. The light pulse responder generates a light pulse in response to incidence of light. The counter section includes a rewrite circuit and an adder circuit. The rewrite circuit rewrites an initial value. The adder circuit adds information corresponding to the light pulse to the initial value. The controller causes information held in the counter section to be written as the initial value into the counter section included in the pixel of a next stage in a column direction, and thereafter causes the information corresponding to the light pulse obtained from the light pulse responder to be added to the initial value.

An information processing system according to a second aspect of the present disclosure includes an imaging unit that acquires image data by imaging, and a processor that processes the image data acquired by the imaging unit. In the information processing system according to the second aspect of the present disclosure, the imaging unit includes a plurality of pixels disposed in a matrix form, a controller that performs TDI control on the plurality of pixels, and an output section that outputs the image data obtained by the TDI control to the processor. Each of the pixels includes a light pulse responder and a counter section. The light pulse responder generates a light pulse in response to incidence of light. The counter section includes a rewrite circuit and an adder circuit. The rewrite circuit rewrites an initial value. The adder circuit adds information corresponding to the light pulse to the initial value. The controller causes information held in the counter section to be written as the initial value into the counter section included in the pixel of a next stage in a column direction, and thereafter causes the information corresponding to the light pulse obtained from the light pulse responder to be added to the initial value.

In the imaging unit according to the first aspect of the present disclosure and the information processing system according to the second aspect of the present disclosure, in each of the pixels, the information held in the counter section is written as the initial value into the counter section included in the pixel of the next stage in the column direction, and thereafter the information corresponding to the light pulse obtained from the light pulse responder is added to the initial value. Thus, the information held in the counter section after the addition is written as the initial value into the counter section included in the pixel of the next stage in the column direction. As a result, it is possible to perform the addition process without performing any AD conversion process. Further, pixel data obtained in such a manner is low-noise data, and therefore it is not necessary to perform any CDS process.

An imaging unit according to a third aspect of the present disclosure includes a plurality of pixels disposed in a matrix form, and a controller that performs TDI control on the plurality of pixels. Each of the pixels includes a light pulse responder, a switch section, and a counter section. The light pulse responder generates a light pulse in response to incidence of light. The switch section couples one of input terminals and one output terminal to each other, a number of the input terminals being equal to a number of the pixels included in a column line. The counter section integrates pieces of information corresponding to the light pulses obtained from all the light pulse responders included in the column line via the switch section. The controller causes the switch section to sequentially select all the light pulse responders included in the column line one by one, and thereby causes the counter section to integrate the pieces of information corresponding to the light pulses obtained from all the light pulse responders.

An information processing system according to a fourth aspect of the present disclosure includes an imaging unit that acquires image data by imaging, and a processor that processes the image data acquired by the imaging unit. In the information processing system according to the fourth aspect of the present disclosure, the imaging unit includes a plurality of pixels disposed in a matrix form, a controller that performs TDI control on the plurality of pixels, and an output section that outputs the image data obtained by the TDI control to the processor. Each of the pixels includes a light pulse responder, a switch section, and a counter section. The light pulse responder generates a light pulse in response to incidence of light. The switch section couples one of input terminals and one output terminal to each other, a number of the input terminals being equal to a number of the pixels included in a column line. The counter section integrates pieces of information corresponding to the light pulses obtained from all the light pulse responders included in the column line via the switch section. The controller causes the switch section to sequentially select all the light pulse responders included in the column line one by one, and thereby causes the counter section to integrate the pieces of information corresponding to the light pulses obtained from all the light pulse responders.

In the imaging unit according to the third aspect of the present disclosure and the information processing system according to the fourth aspect of the present disclosure, the switch section sequentially selects all the light pulse responders included in the column line one by one, and the counter section thus integrates the pieces of information corresponding to the light pulses obtained from all the light pulse responders. As a result, it is possible to perform the addition process without performing any AD conversion process. Further, pixel data obtained in such a manner is low-noise data, and therefore it is not necessary to perform any CDS process.

An imaging unit according to a fifth aspect of the present disclosure includes a plurality of pixels disposed in a matrix form, and a generator that generates image data by performing a TDI process with use of information obtained from a plurality of sets of pixel lines of the plurality of pixels, the plurality of sets of pixel lines being disposed to be aligned in a row direction. Each of the pixels includes a light pulse responder and a counter section. The light pulse responder generates a light pulse in response to incidence of light. The counter section integrates information corresponding to the light pulse obtained from the light pulse responder.

An information processing system according to a sixth aspect of the present disclosure includes an imaging unit that acquires image data by imaging, and a processor that processes the image data acquired by the imaging unit. In the information processing system according to the sixth aspect of the present disclosure, the imaging unit includes a plurality of pixels disposed in a matrix form, and a generator that generates the image data by performing a TDI process with use of information obtained from a plurality of sets of pixel lines of the plurality of pixels, the plurality of sets of pixel lines being disposed to be aligned in a row direction. Each of the pixels includes a light pulse responder and a counter section. The light pulse responder generates a light pulse in response to incidence of light. The counter section integrates information corresponding to the light pulse obtained from the light pulse responder.

In the imaging unit according to the fifth aspect of the present disclosure and the information processing system according to the sixth aspect of the present disclosure, image data is generated by integrating the information corresponding to the light pulse obtained from the light pulse responder in each of the pixels and performing the TDI process with use of the information (an integrated value) obtained from a plurality of sets of pixel lines of the plurality of pixels, the plurality of sets of pixel lines being disposed to be aligned in the row direction. It is thus possible to perform the TDI process without performing any AD conversion process. Further, pixel data obtained in such a manner is low-noise data, and therefore it is not necessary to perform any CDS process.

BRIEF DESCRIPTION OF DRAWINGS

FIG. 1 is a diagram illustrating a functional block example of an imaging unit according to one embodiment of the present disclosure.

FIG. 2 is a diagram illustrating a schematic configuration example of a solid-state imaging device of FIG. 1.

FIG. 3 is a diagram illustrating a circuit configuration example of a pixel of FIG. 1.

FIG. 4 is a diagram illustrating a schematic configuration example of a counter section of FIG. 3.

FIG. 5 is a diagram illustrating how the solid-state imaging device of FIG. 1 is formed on a substrate.

FIG. 6 is a timing chart illustrating an example of a method of controlling the solid-state imaging device of FIG. 1.

FIG. 7 is a diagram illustrating a modification example of a schematic configuration of the counter section of FIG. 3.

FIG. 8 is a diagram illustrating a modification example of the schematic configuration of the counter section of FIG. 3.

FIG. 9 is a diagram illustrating how the solid-state imaging device of FIG. 1 is formed on a stacked substrate.

FIG. 10 is a diagram illustrating a modification example of a circuit configuration of the pixel of FIG. 1.

FIG. 11 is a diagram illustrating a modification example of the circuit configuration of the pixel of FIG. 1.

FIG. 12 is a diagram illustrating a modification example of the circuit configuration of the pixel of FIG. 1.

FIG. 13 is a diagram illustrating a modification example of the circuit configuration of the pixel of FIG. 1.

FIG. 14 is a timing chart illustrating an example of a method of controlling a solid-state imaging device that includes the pixel of FIG. 13.

FIG. 15 is a diagram illustrating an example of a circuit configuration of a detector of FIG. 13.

FIG. 16 is a timing chart illustrating an example of a method of controlling the detector of FIG. 13.

FIG. 17 is a diagram illustrating a modification example of the circuit configuration of the pixel of FIG. 1.

FIG. 18 is a timing chart illustrating an example of a method of controlling a solid-state imaging device that includes the pixel of FIG. 17.

FIG. 19 is a diagram illustrating an example of a circuit that inputs a control signal to the detector of FIG. 3, 12, or 13.

FIG. 20 is a diagram illustrating an example of the circuit that inputs the control signal to the detector of FIG. 3, 12, or 13.

FIG. 21 is a diagram illustrating a modification example of the circuit configuration of the pixel of FIG. 1.

FIG. 22 is a timing chart illustrating an example of a method of controlling a solid-state imaging device that includes the pixel of FIG. 21.

FIG. 23 is a diagram illustrating how counting is performed upon incidence of light of low illuminance.

FIG. 24 is a diagram illustrating how counting is performed upon incidence of light of medium illuminance.

FIG. 25 is a diagram illustrating how counting is performed upon incidence of light of high illuminance.

FIG. 26 is a diagram illustrating a modification example of the circuit configuration of the pixel of FIG. 1.

FIG. 27 is a diagram for describing a data pattern of a solid-state imaging device that includes the pixel of FIG. 26.

FIG. 28 is a diagram for describing switching in the solid-state imaging device that includes the pixel of FIG. 26.

FIG. 29 is a diagram for describing data output in the solid-state imaging device that includes the pixel of FIG. 26.

FIG. 30 is a diagram illustrating a modification example of the circuit configuration of the pixel of FIG. 1.

FIG. 31 is a diagram for describing switching in a solid-state imaging device that includes the pixel of FIG. 30.

FIG. 32 is a diagram for describing data output in the solid-state imaging device that includes the pixel of FIG. 30.

FIG. 33 is a diagram illustrating a modification example of a schematic configuration of the solid-state imaging device of FIG. 1.

FIG. 34 is a diagram illustrating a modification example of the schematic configuration of the solid-state imaging device of FIG. 1.

FIG. 35 is a diagram illustrating a modification example of the circuit configuration of the pixel of FIG. 1.

FIG. 36 is a timing chart illustrating an example of a method of controlling a solid-state imaging device that includes the pixel of FIG. 35.

FIG. 37 is a diagram illustrating a schematic configuration example of a light pulse responder of FIG. 3, 4, 7, 8, 10, 12, 13, 17, 21, 26, 30, or 35.

FIG. 38 is a diagram illustrating a schematic configuration example of the light pulse responder of FIG. 3, 4, 7, 8, 10, 12, 13, 17, 21, 26, 30, or 35.

FIG. 39 is a diagram illustrating an example of factory automation including the imaging unit of FIG. 1.

FIG. 40 is a diagram illustrating an example of a biological sample analysis apparatus including the imaging unit of FIG. 1.

MODES FOR CARRYING OUT THE INVENTION

In the following, some embodiments of the present disclosure are described in detail with reference to the drawings. It is to be noted that description is given in the following order.

1. Embodiment (FIGS. 1 to 6)
2. Modification Examples (FIGS. 7 to 38)
3. Application Examples (FIGS. 39 and 40)

1. Embodiment

Configuration

FIG. 1 illustrates a functional block example of an imaging unit 100 according to an embodiment of the present disclosure. As illustrated in FIG. 1, for example, the imaging unit 100 is a unit that acquires image data by imaging, and includes an optical system 110, a solid-state imaging device 120, a controller 130, and a communicator 140.

The optical system 110 condenses incident light and guides the condensed incident light to the solid-state imaging device 120. The solid-state imaging device 120 acquires image data by imaging, and outputs the image data acquired by imaging to outside via the communicator 140. The solid-state imaging device 120 includes a plurality of pixels 10 to be described later. The plurality of pixels 10 is two-dimensionally disposed in an effective pixel region. The communicator 140 is an interface that performs communications with external equipment, and outputs the image data obtained by the solid-state imaging device 120 to the external equipment.

The controller 130 controls the solid-state imaging device 120 to cause the solid-state imaging device 120 to acquire image data by imaging. The controller 130 performs TDI (Time Delay Integration) control on the solid-state imaging device 120 (the plurality of pixels 10 to be described later).

The controller 130 supplies the solid-state imaging device 120 with, for example, a vertical synchronization signal indicating an imaging timing, and control signals φ1, φ2, and φ3 for controlling a detector 12 to be described later. For example, the controller 130 selects a plurality of pixels 10 (a row line) disposed to be aligned in a row direction simultaneously to thereby cause a plurality of pieces of pixel data obtained at the selected row line to be outputted to a row line of a next stage (a next row). At this time, the controller 130 selects a plurality of row lines sequentially in predetermined cycles, for example. A selection cycle of the plurality of row lines corresponds to an imaging cycle of the solid-state imaging device 120. In a case where the imaging unit 100 includes a measurement section that measures a speed of an imaging target object, the controller 130 may select the plurality of pixels 10 (the row line) in cycles based on speed data obtained by the measurement section. The controller 130 may set a magnitude of the cycle of pixel selection to allow the imaging target object to travel by a pixel pitch in a column direction during one cycle of pixel selection, for example.

FIG. 2 illustrates a schematic configuration example of the solid-state imaging device 120. The solid-state imaging device 120 includes a TDI sensor, and acquires image data of high sensitivity and low noise. As illustrated in FIG. 2, for example, the solid-state imaging device 120 includes a pixel array section 121 and an interface section 122. The pixel array section 121 includes the plurality of pixels 10 performing photoelectric conversion. The plurality of pixels 10 is disposed in a matrix form in the effective pixel region. In the solid-state imaging device 120, an imaging target object is assumed to travel at a constant speed in the column direction (an up-down direction in the sheet plane of FIG. 2) with respect to the pixel array section 121, for example. The interface section 122 acquires a sum of a plurality of pieces of pixel data obtained from a plurality of pixels 10 (a column line) disposed to be aligned in the column direction, on a column line by column line basis, for example.

FIG. 3 illustrates a circuit configuration example of the pixel 10. As illustrated in FIG. 3, for example, the pixel 10 includes a light pulse responder 11 and the detector 12. The light pulse responder 11 generates a light pulse in response to incidence of light. The light pulse responder 11 includes, for example, a light receiving section 11$b$ and a quench section 11$a$.

The light receiving section 11$b$ includes an avalanche photodiode (APD). In the APD of a Geiger mode, when a voltage higher than or equal to a breakdown voltage is applied between terminals, an avalanche phenomenon occurs upon incidence of a single photon. The APD in which a single photon causes multiplication by the avalanche phenomenon is referred to as a single photon avalanche diode (SPAD). In each pixel 10, the light pulse responder 11 includes the SPAD, for example. The quench section 11$a$ has a function of stopping (quenching) the avalanche phenomenon by reducing the voltage applied to the light receiving section 11$b$ to the breakdown voltage. The quench section 11$a$ further has a function of enabling detection of a photon again at the light receiving section 11$b$ by causing the voltage applied to the light receiving section 11$b$ to be a bias voltage higher than or equal to the breakdown voltage. The quench section 11$a$ includes a MOS transistor, for example. The quench section 11$a$ may be a resistor, for example.

One end of the quench section 11$a$ (for example, a source of the MOS transistor) is coupled to a power supply line Vdd to which a fixed voltage VDD is applied. In contrast, another end of the quench section 11$a$ (for example, a drain of the MOS transistor) is coupled to one end of the light receiving section 11b (for example, a cathode of the APD) via a signal line L1. Another end of the light receiving section 11b (for example, an anode of the APD) is coupled to a power supply line Vss to which a reference voltage Van is applied, for example. Values of the fixed voltage VDD and the reference voltage Van are set to cause a voltage higher than or equal to the breakdown voltage to be applied to the light receiving section 11b. The signal line L1 is coupled to the other end of the quench section 11a (for example, the drain of the MOS transistor) and the one end of the light receiving section 11b (for example, the cathode of the APD).

In each of the pixels 10, the detector 12 includes a counter section 12b. In each of the pixels 10 included in a second and subsequent row lines, the detector 12 includes a switch section 12a, the counter section 12b, a switch section 12c, a latch section 12d, and a switch section 12e. In each of the pixels 10 included in a first row line, the detector 12 includes the switch section 12a, the counter section 12b, the switch section 12c, and the latch section 12d. It is to be noted that in each of the pixels 10 included in the first row line, the detector 12 may further include the switch section 12e.

One end of the switch section 12a is coupled to the signal line L1. Another end of the switch section 12a is coupled to an input end of the counter section 12b (an input end of an adder circuit to be described later). The switch section 12a controls coupling and decoupling between the signal line L1 and the input end of the counter section 12b. For example, the counter section 12b includes a digital counter of k bits (k≥1) as illustrated in FIG. 4. The digital counter is a digital circuit including a latch circuit and the like. The counter section 12b includes a circuit (a rewrite circuit) that rewrites an initial value in response to input of a signal (a rewrite signal) from the latch section 12d of the pixel 10 included in the row line of a preceding stage (a first previous row), and a circuit (the adder circuit) that adds an input signal (an addition signal) from the light pulse responder 11 to the initial value.

One end of the switch section 12c is coupled to an output end of the counter section 12b (an output end of the adder circuit). Another end of the switch section 12c is coupled to an input end of the latch section 12d. The switch section 12c controls coupling and decoupling between the output end of the counter section 12b and the input end of the latch section 12d. For example, the latch section 12d is a digital circuit that is able to hold information of k bits (k≥1) as illustrated in FIG. 4. An output end of the latch section 12d is coupled to one end of the switch section 12e of the pixel 10 included in the row line of the next stage (the next row). The latch section 12d outputs information held therein to the counter section 12b (an input end of the rewrite circuit) of the pixel 10 included in the row line of the next stage via the switch section 12e of the pixel 10 included in the row line of the next stage. The latch section 12d writes the information held therein as the initial value into the counter section 12b of the pixel 10 included in the row line of the next stage. The one end of the switch section 12e is coupled to the output end of the latch section 12d of the pixel 10 included in the row line of the preceding stage (the first previous row). Another end of the switch section 12e is coupled to the input end of the counter section 12b (the input end of the rewrite circuit).

For example, as illustrated in FIG. 5, the solid-state imaging device 120 is formed on a single semiconductor substrate 20. In this case, the effective pixel region in which the plurality of pixels 10 is disposed in a matrix form is formed on a surface of the semiconductor substrate 20. On the surface of the semiconductor substrate 20, for example, the interface section 122 and the like are implemented around the effective pixel region.

[Operation]

Next, a description will be given of an operation of the imaging unit 100. FIG. 6 is a timing chart illustrating an example of a method of controlling the solid-state imaging device 120. The controller 130 turns on the switch section 12a of each pixel 10 by setting the control signal φ1 to High. Photons are thus inputted to the counter section 12b from the light receiving section 11b where the avalanche phenomenon occurs. Subsequently, upon a lapse of a predetermined exposure period, the controller 130 turns off the switch section 12a of each pixel 10 by setting the control signal φ1 to low. The input of the photons from the light receiving section 11b to the counter section 12b is thus stopped. At this time, at the counter section 12b, information corresponding to the number of the inputted photons is added to the initial value, and information (held information) thereby obtained is held.

Thereafter, the controller 130 turns on the switch section 12c of each pixel 10 by setting the control signal φ2 to High. The counter section 12b thus outputs the information (the held information) held in the counter section 12b to the latch section 12d via the switch section 12c. The latch section 12d holds the information (the held information) inputted from the counter section 12b. Thereafter, the controller 130 turns off the switch section 12c of each pixel 10 by setting the control signal φ2 to low. Thereafter, the controller 130 turns on the switch section 12e of each pixel 10 by setting the control signal φ3 to High. The latch section 12d thus outputs the information (the held information) held in the latch section 12d to the counter section 12b via the switch section 12e. The counter section 12b holds the information (the held information) inputted from the latch section 12d as the initial value.

In this way, pixel data of the row line of the preceding stage is transferred to the row line of the next stage, and the pixel data of the row line of the preceding stage and pixel data of the row line of the next stage are added together. The controller 130 thus causes the information held in the counter section 12b to be written as the initial value into the counter section 12b included in the pixel 10 of the next stage 10 in the column direction, and thereafter causes the information corresponding to the light pulse obtained from the light pulse responder 11 to be added to the initial value. Further, the controller 130 causes the information inputted from the counter section 12b and held in the latch section 12d to be written as the initial value into the counter section 12b included in the pixel 10 of the next stage in the column direction.

The controller 130 executes this repeatedly to thereby cause the sum of the plurality of pieces of pixel data, for each of the column lines, obtained from the plurality of pixels 10 (the column line) disposed to be aligned in the column direction, to be outputted to the interface section 122.

Effects

Next, a description will be given of effects of the imaging unit 100.

In the present embodiment, the information held in the counter section 12b in each pixel 10 is written as the initial value into the counter section 12b included in the row line of the next stage (the next row), and the information obtained from the light pulse responder 11 in response to incidence of light is added to the initial value of the counter section 12b. Thus, the information held in the counter section 12b after the addition is written as the initial value into the counter section 12b included in the row line of the next stage (the next row). As a result, it is possible to perform the addition process without performing any AD conversion process. Further, the pixel data obtained in such a manner is low-noise data, and therefore it is not necessary to perform any CDS process. It is thus possible to provide the imaging unit 100 that necessitates neither the AD conversion process nor the CDS process.

According to the present embodiment, the information inputted from the counter section 12b and held in the latch section 12d is written as the initial value into the counter section 12b included in the pixel 10 of the next stage in the column direction. By providing the latch section 12d between the two counter sections 12b in this way, it is possible to achieve transfer of image data with simple control.

2. Modification Examples

Next, a description will be given of modification examples of the solid-state imaging device 120 according the foregoing embodiment.

Modification Example A

In the counter section 12b, an update frequency is low for a counter of a higher-order bit. In the switch section 12c, an operation frequency is also low for a switch coupled to the higher-order bit of the counter section 12b. In the latch section 12d, the operation frequency is also low for a latch coupled to the higher-order bit of the counter section 12b. In the switch section 12e, the operation frequency is also low for a switch coupled to the higher-order bit of the counter section 12b.

Given this situation, in the foregoing embodiment, the higher-order bit of the counter section 12b and portions of the switch section 12c, the latch section 12d, and the switch section 12e that are coupled to the higher-order bit of the counter section 12b may be formed in a region (an outside-array region R2) outside a formation region of the pixel array section 121 in the solid-state imaging device 120, as illustrated in FIG. 7, for example. In this case, a bit of the counter section 12b other than the higher-order bit and portions of the switch section 12c, the latch section 12d, and the switch section 12e that are coupled to the bit other than the higher-order bit of the counter section 12b may be formed in the formation region of the pixel array section 121 (an array region R1) in the solid-state imaging device 120, as illustrated in FIG. 7, for example. One reason for this is that the operation frequency of the higher-order bit of the counter section 12b is low and therefore even if a delay occurs in a signal controlling the higher-order bit of the counter section 12b, there may be cases where the delay presents no problem. Further, forming the higher-order bit of the counter section 12b and the like in the outside-array region R2 makes it possible to reduce an area of the array region R1.

Modification Example B

In the plurality of pixels 10 (the column line) disposed to be aligned in the column direction, a counter value of the counter section 12b increases toward a later stage of the column line. Accordingly, there is a possibility that the counter value of the counter section 12b is saturated in the later stage of the column line.

To address this, in the foregoing embodiment and modification examples thereof, the counter section 12b, the switch section 12c, the latch section 12d, and the switch section 12e may each be configured so that the number of bits is larger at a later stage of the column line than at an initial stage of the column line, as illustrated in FIG. 8, for example. By employing such a configuration, it is possible to prevent saturation of the counter section 12b while suppressing a circuit size, as compared with a case where the number of bits is made large in the entire column line.

Modification Example C

In the foregoing embodiment and modification examples thereof, the solid-state imaging device 120 may be dispersedly formed on a plurality of semiconductor substrates that are stacked. For example, as illustrated in FIG. 9, the solid-state imaging device 120 may be dispersedly formed on two semiconductor substrates 21 and 22 that are stacked. In this case, of each pixel 10, a portion (hereinafter referred to as a "circuit 21a") other than the light receiving section 11b may be formed on a first semiconductor substrate 21. Further, of each pixel 10, a portion (hereinafter referred to as a "circuit 22a") including the light receiving section 11b may be formed on a second semiconductor substrate 22. The circuit 21a and the circuit 22a may be electrically coupled by, for example, bonding a pad electrode 21b coupled to the circuit 21a and a pad electrode 22b coupled to the circuit 22a to each other.

Modification Example D

In the foregoing embodiment and modification examples thereof, as illustrated in FIG. 10, for example, the light pulse responder 11 of each pixel 10 may include a plurality of subpixels 11-1 and an adder 11-2 coupled to outputs of the plurality of subpixels 11-1.

Each subpixel 11-1 includes the quench section 11a, the light receiving section 11b, and a pulse generator 11c. The pulse generator 11c is coupled to the signal line L1, and a photon outputted from the light receiving section 11b is inputted to the pulse generator 11c. The pulse generator 11c generates a pulse in response to the photon inputted from the light receiving section 11b, and outputs the pulse to the adder 11-2. The adder 11-2 counts the pulses inputted from the plurality of subpixels 11-1, and outputs a number of pulses corresponding to a count value obtained thereby to the detector 12. By using the plurality of subpixels 11-1 and the adder 11-2 in this way, it is possible to obtain a high-sensitivity image.

Modification Example E

In Modification Example D described above, as illustrated in FIG. 11, for example, the pulse generator 11c may be omitted. In this case, the adder 11-2 counts photons inputted from each subpixel 11-1, and outputs a number of pulses corresponding to the count value obtained thereby to the detector 12. Even in a case where such a configuration is employed, it is possible to obtain a high-sensitivity image by using pixel data obtained by addition at the adder 11-2.

Modification Example F

In the column lines of the foregoing embodiment and modification examples thereof, as illustrated in FIG. 12, for example, the latch section 12d and the switch section 12c may be omitted for the pixels 10 in every odd-numbered line. Even in a case where such a configuration is employed, it is possible to provide the imaging unit 100 that necessitates neither the AD conversion process nor the CDS process by virtue of the controller 130 controlling the solid-state imaging device 12 at timings illustrated in FIG. 6, for example.

Modification Example G

In the column lines of the foregoing embodiment and modification examples thereof, as illustrated in FIG. 13, for example, all the pixels 10 may be provided with a detector 12A from which the latch section 12d and the switch section 12c are omitted. In a case where such a configuration is employed, the controller 130 may input control signals φ2_0, φ2_1, φ2_2, and φ2_3 to the solid-state imaging device 12 at timings illustrated in FIG. 14, for example. This makes it possible to provide the imaging unit 100 that necessitates neither the AD conversion process nor the CDS process.

FIG. 15 illustrates an example of a circuit configuration of the detector 12A. The detector 12A includes a plurality of 1-bit counters coupled in series, a multiplexer (hereinafter referred to as a "first multiplexer") that controls input of control signals (SHIFT_PULSE and PC_PULSE_i (i=A, B, . . . )) to the plurality of 1-bit counters, and a NOT circuit.

The 1-bit counter includes, for example, a D flip-flop including a plurality of (two) D latches, and a multiplexer (hereinafter referred to as a "second multiplexer") coupled to a data input terminal of the D flip-flop. That is, the detector 12A has the D flip-flop on a bit-by-bit basis.

An output of the first multiplexer is inputted as a clock of the D latch in a preceding stage of the D flip-flop. An output (an output of the NOT circuit) obtained through inverting the output of the first multiplexer is inputted as a clock of the D latch in a subsequent stage of the D flip-flop. The output of the D flip-flop in the same stage (the same row) as the first multiplexer and the output of the D flip-flop included in the row line of the preceding stage (the preceding row) are inputted to the first multiplexer. The controller 130 outputs the control signals (SHIFT_PULSE and PC_PULSE_i (i=A, B, . . . )) to the detector 12A at the timings illustrated in FIG. 16, for example. In this case, it is seen that the D flip-flop provided for each of the 1-bit counters also serves as the latch section. This makes it possible to suppress an increase in the circuit size.

Modification Example H

In the foregoing embodiment and modification examples thereof, each pixel 10 may include a plurality of detectors 12. As illustrated in FIG. 17, for example, each pixel 10 may include two detectors 12 and an adder 16 that adds up output values of the two detectors 12.

In this case, the two detectors 12 are coupled to the common light pulse responder 11. In the plurality of pixels 10 included in the column line, first ones of the detectors 12 are coupled in line, and second ones of the detectors 12 are also coupled in line. The controller 130 causes information held in the first one of the detectors 12 (hereinafter referred to as a "detector 12L") to be written as the initial value into the detector 12L included in the pixel 10 of the next stage in the column direction, and while doing so, causes information held in the second one of the detectors 12 (hereinafter referred to as a "detector 12R") to be written as the initial value into the detector 12R included in the pixel 10 of the next stage in the column direction.

For example, as illustrated in FIG. 18, the controller 130 performs exposure separately for a preceding stage and a subsequent stage in a single line cycle. The controller 130 outputs the control signals φ2 and φ3 sequentially to the first ones of the detectors 12 of the plurality of pixels 10 included in the column line after exposure of the preceding stage (during exposure of the subsequent stage), for example. The controller 130 further outputs control signals φ2' and φ3' sequentially to the second ones of the detectors 12 of the plurality of pixels 10 included in the column line after exposure of the subsequent stage (during exposure of the preceding stage). By doing so, it is possible to greatly reduce an unexposure time as compared with a case where exposure is performed for only the preceding stage in the single line cycle as in the foregoing embodiment. As a result, it is possible to provide the imaging unit 100 of higher sensitivity.

Modification Example I

In the foregoing embodiment and modification examples thereof, as illustrated in FIG. 19, for example, repeaters 31 may be provided at predetermined locations on the wiring lines in order to ameliorate waveform rounding, caused by wiring resistance or the like, of the control signals (for example, the control signals φ1, φ2, and φ3) outputted from the controller 130 to each detector 12. The repeaters 31 are inserted to the wiring lines through which the control signals inputted from the controller 130 to the plurality of pixels 10 propagate. Further, as illustrated in FIG. 20, for example, shift registers 32 may be provided instead of the repeaters 31 at the predetermined locations on the wiring lines. Providing the repeaters 31 or the shift registers 32 in this way makes it possible to input, to the detectors 12, control pulses that do not depend on distances from the controller 130 to the detectors 12. As a result, it is possible to uniformize exposure times of the respective pixels 10.

Modification Example J

In the foregoing embodiment and modification examples thereof, as illustrated in FIG. 21, for example, each detector 12 may include an OF determination section 12h that determines whether or not the counter section 12b is saturated. When the count value of the counter section 12b is less than or equal to a predetermined threshold, the OF determination section 12h determines that the counter section 12b is not saturated, and outputs a Low-level FLAG (=0), for example. When the count value of the counter section 12b exceeds the predetermined threshold, the OF determination section 12h determines that the counter section 12b is saturated, and outputs a High-level FLAG (=1), for example.

In each of the pixels 10 included in the second and subsequent row lines, each of the detectors 12 includes, as illustrated in FIG. 21, for example, switch sections 12a, 12c, 12e, 12g, and 12i, a multiplexer 12f, the counter section 12b, the OF determination section 12h, and latch sections 12d and 12j. In each of the pixels 10 included in the first row line, the detector 12 includes, as illustrated in FIG. 21, for example, the switch sections 12a, 12c, and 12i, the multiplexer 12f, the counter section 12b, the OF determination section 12h, and the latch sections 12d and 12j.

One end of the switch section 12a is coupled to the signal line L1. Another end of the switch section 12a is coupled to an input end of the multiplexer 12f. The switch section 12a controls coupling and decoupling between the signal line L1 and the input end of the multiplexer 12f. The input end of the multiplexer 12f is coupled to the other end of the switch section 12a and a wiring line to which a clock CLK is inputted. An output end of the multiplexer 12f is coupled to the input end of the counter section 12b (the input end of the adder circuit).

One end of the switch section 12i is coupled to an output end of the OF determination section 12h (the output end of the adder circuit to be described later). Another end of the switch section 12i is coupled to an input end of the latch section 12j. The switch section 12i controls coupling and decoupling between the output end of the OF determination section 12h (the output end of the adder circuit) and the input end of the latch section 12j. For example, the latch section 12j is a digital circuit that is able to hold information of m bits (m≥1). An output end of the latch section 12d is coupled to one end of the switch section 12g of the pixel 10 included in the row line of the next stage (the next row). The latch section 12j outputs information held therein to the OF determination section 12h of the pixel 10 included in the row line of the next stage via the switch section 12g of the pixel 10 included in the row line of the next stage. The latch section 12d writes the information held therein as the initial value into the counter section 12b of the pixel 10 included in the row line of the next stage. The one end of the switch section 12g is coupled to the output end of the latch section 12j of the pixel 10 included in the row line of the preceding stage (the first previous row). Another end of the switch section 12g is coupled to the input end of the OF determination section 12h (the input end of the rewrite circuit).

When the Low-level FLAG is inputted from the OF determination section 12h, for example, the multiplexer 12f outputs a photon inputted via the switch section 12a to the counter section 12b. At this time, the counter section 12b executes counting of the photons. When the High-level FLAG is inputted from the OF determination section 12h, for example, the multiplexer 12f outputs the clock CLK inputted from the wiring line to the counter section 12b. At this time, the counter section 12b executes counting of the clocks CLK. For example, when a FLAG that changes from the Low level to the High level is inputted from the OF determination section 12h, the counter section 12b resets the counter and starts counting the clocks CLK. For example, when a FLAG that changes from the High level to the Low level is inputted from the OF determination section 12h, the counter section 12b resets the counter and starts counting the photons.

When the count value of the counter section 12b is less than or equal to a predetermined threshold, the OF determination section 12h outputs the Low-level FLAG to the multiplexer 12f, the counter section 12b, and the switch section 12i, for example. When the count value of the counter section 12b exceeds the predetermined threshold, the OF determination section 12h outputs the High-level FLAG to the multiplexer 12f, the counter section 12b, and the switch section 12i, for example.

The OF determination section 12h further determines saturation of the counter section 12b on the basis of information inputted from the latch section 12j of the pixel 10 included in the row line of the preceding stage (the preceding row) via the switch section 12g. For example, when the Low-level FLAG is inputted via the switch section 12g, the OF determination section 12h determines that the counter section 12b is not yet saturated in the preceding stage (the first previous row), and outputs the Low-level FLAG to the multiplexer 12f, the counter section 12b, and the switch section 12i. For example, when the High-level FLAG is inputted via the switch section 12g, the OF determination section 12h determines that the counter section 12b is already saturated in the preceding stage (the first previous row), and outputs the High-level FLAG to the multiplexer 12f, the counter section 12b, and the switch section 12i.

FIG. 22 is a timing chart illustrating an example of a method of controlling the solid-state imaging device 120 that includes the pixel of FIG. 21. The controller 130 turns on the switch section 12a of each pixel 10 by setting the control signal φ1 to High. Photons are thus inputted to the counter section 12b from the light receiving section 11b where the avalanche phenomenon occurs. Subsequently, upon a lapse of a predetermined exposure period, the controller 130 turns off the switch section 12a of each pixel 10 by setting the control signal φ1 to low. The input of the photons from the light receiving section 11b to the counter section 12b is thus stopped. At this time, at the counter section 12b, information corresponding to the number of the inputted photons is added to the initial value, and information (held information) thereby obtained is held.

Thereafter, the controller 130 turns on the switch sections 12c and 12i of each pixel 10 by setting the control signal φ2 to High. The counter section 12b thus outputs the information (the held information) held in the counter section 12b to the latch section 12d via the switch section 12c. The latch section 12d holds the information (the held information) inputted from the counter section 12b. In addition, the OF determination section 12h outputs the information (the held information) held in the OF determination section 12h to the latch section 12j via the switch section 12i. The latch section 12j holds the information (the held information) inputted from the OF determination section 12h.

Thereafter, the controller 130 turns off the switch sections 12c and 12i of each pixel 10 by setting the control signal 2 to low. Subsequently, the controller 130 turns on the switch sections 12e and 12g of each pixel 10 by setting the control signal φ3 to High. The latch section 12d thus outputs the information (the held information) held in the latch section 12d to the counter section 12b via the switch section 12e. The counter section 12b holds the information (the held information) inputted from the latch section 12d as the initial value. The latch section 12j outputs the information (the held information) held in the latch section 12j to the OF determination section 12h via the switch section 12g. The OF determination section 12h determines whether or not the counter section 12b is already saturated in the preceding stage (the first previous row) on the basis of the information (the held information) inputted from the latch section 12j. When the counter section 12b is saturated, the OF determination section 12h changes the FLAG from the Low level (=0) to the High level (=1), for example. Then, the counter section 12b resets the counter and starts counting the clocks CLK.

In this way, the pixel data of the row line of the preceding stage is transferred to the row line of the next stage, and the pixel data of the row line of the preceding stage and the pixel data of the row line of the next stage are added together. The controller 130 executes this repeatedly to thereby cause the sum of the plurality of pieces of pixel data, for each of the column lines, obtained from the plurality of pixels 10 (the column line) disposed to be aligned in the column direction, to be outputted to the interface section 122.

Here, assume that the value (the sum of the plurality of pieces of pixel data obtained from the column line) transferred to the interface section 122 for each column is Nc. In this case, the interface section 122 changes how to handle Nc depending on whether the FLAG is at the Low level (=0) or at the High level (=1). In a case where the FLAG is at the Low level (=0), the interface section 122 outputs Nc as an integrated value N to outside via the communicator 140. In contrast, in a case where the FLAG is at the High level (=1), the interface section 122 outputs a value obtained using the following equations as the integrated value N to outside via the communicator 140.

$$N = Nc \times T\exp / Tc$$

$$Tc = Tclk \times Nc$$

Nc: count value at the counter section 12$b$
Texp: exposure time ($\mu$s) in one frame period
Tc: exposure time ($\mu$s) after counter section 12$b$ is saturated (remaining time)
Tclk: Cycle ($\mu$s) of clock CLK In this way, in the present modification example, the exposure time after the counter section 12$b$ is saturated (the remaining time) is measured by counting of the clocks CLK at the counter section 12$b$. Timing of saturation of the counter section 12$b$ is advanced as the illuminance of incident light increases, as illustrated in FIGS. 23, 24, and 25, for example. However, during a time after the counter section 12$b$ is saturated (the remaining time), the counter section 12$b$ counts the clocks CLK instead of counting photons. The count value of the clocks CLK at the counter section 12$b$ increases as the illuminance of the incident light increases. Further, the count value of the clocks CLK increases as the remaining time becomes longer. Therefore, because the illuminance of the incident light is proportional to a length of the remaining time, dividing the exposure time Texp in one frame period by the remaining time Tc makes it possible to obtain the sum of the pieces of pixel data for the column line that is obtainable when it is assumed that the counter section 12$b$ has not been saturated. Based upon the foregoing, it is possible to expand a dynamic range of the detector 12 by counting the clocks CLK during the remaining time.

It is to be noted that in the present modification example, the counter section 12$b$ may be adapted to, when the FLAG has become the High level (=1), record (hold) a time code at a time when the FLAG has become the High level (=1), instead of starting to count photons. In this case, the OF determination section 12$h$ makes a determination as to whether or not the counter section 12$b$ is saturated, and when a result of the determination is that the counter section 12$b$ is saturated, the OF determination section 12$h$ performs control of causing the counter section 12$b$ to record the time code at that time. The interface section 122 calculates the remaining time with use of the time code transferred for each column. Even in such a case, by calculating the remaining time with use of the time code, it is possible to expand the dynamic range of the detector 12.

Modification Example K

In the foregoing embodiment and modification examples thereof, as illustrated in FIG. 26, for example, a detector 13 may be provided instead of the detector 12. The detector 13 includes a switch section 13$a$ and a counter section 13$b$.

The switch section 13$a$ has input terminals the number of which is equal to the number of pixels 10 that are included in the column line. FIG. 26 illustrates an example state where eight input terminals are provided. In the switch section 13$a$, the input terminals are coupled to respective different light pulse responders 11 included in the column line. An output terminal of the switch section 13$a$ is coupled to an input terminal of the counter section 13$b$. The counter section 13$b$ includes a digital counter of k bits (k≥1), for example. The digital counter is a digital circuit including a latch circuit and the like. The counter section 13$b$ includes a circuit (an integration circuit) that integrates input signals from the switch section 13$a$. An output terminal of the counter section 13$b$ is coupled to the interface section 122.

FIG. 27 conceptually illustrates a switching example of a data pattern for each horizontal period in an imaging region of the solid-state imaging device 120. In FIGS. 26 and 27, p0 to p7 are signs assigned to a plurality of light pulse responders 11 included in the column line. FIG. 27 suggests that a plurality of objects aligned in the column direction travel at a speed equal to a line rate in the column direction in the imaging region.

FIG. 28 conceptually illustrates a switching example of the counter section 13$b$ for each horizontal period. In the present modification example, as illustrated in FIG. 28, for example, the controller 130 outputs control signals φa to φh to the column line to cause each switch section 13$a$ included in the column line to sequentially select all the light pulse responders 11 included in the column line one by one. By causing the switch section 13$a$ to sequentially select all the light pulse responders 11 included in the column line one by one, the controller 130 causes the counter section 13$b$ to integrate pieces of information corresponding to light pulses obtained from all the light pulse responders 11.

FIG. 29 conceptually illustrates pixel data to be outputted from each counter section 13$b$ included in the column line as a result of performing switching illustrated in FIG. 28. In FIG. 29, each counter section 13$b$ included in the column line outputs information (held information) corresponding to the number of photons inputted from all the light pulse responders 11 included in the column line to the interface section 122 at timings with shading. The held information corresponds to the sum of a plurality of pieces of pixel data obtained from the column line. It is to be noted that at timings without shading in FIG. 29, each counter section 13$b$ outputs information (held information) corresponding to the number of photons inputted from some of the light pulse responders 11 included in the column line to the interface section 122.

In this way, in the present modification example, each counter section 13$b$ included in the column line acquires the sum of the pieces of pixel data obtained from the pixels 10 included in the column line and outputs the sum to the interface section 122. This makes it possible for the addition process on the column line to be performed at each counter section 13$b$ included in the column line. Further, the pixel data obtained in such a manner is low-noise data, and therefore it is not necessary to perform any CDS process. It is thus possible to provide the imaging unit 100 that necessitates neither the AD conversion process nor the CDS process.

Modification Example L

In Modification Example K described above, in the solid-state imaging device 120, a plurality of column lines each including "a plurality of pixels 10 provided with the detectors 13" may be disposed to be aligned in the column direction, as illustrated in FIG. 30, for example. In this case, in the solid-state imaging device 120, a transfer section 14 that transfers the sum of the pieces of pixel data obtained from the column line of a first stage as the initial value of the detector 13 (the counter section 13*b*) of the column line of the next stage may be provided for each pixel 10 included in the column line of the first stage.

The transfer section 14 includes, for example, two switch sections 14*a* and 14*c* and a latch section 14*b*.

One end of the switch section 14*a* is coupled to an output end of the detector 13 of corresponding one of the pixels 10. Another end of the switch section 14*a* is coupled to an input end of the latch section 14*b*. The switch section 12*i* controls coupling and decoupling between the output end of the detector 13 of corresponding one of the pixels 10 and the input end of the latch section 14*b*. For example, the latch section 14*b* is a digital circuit that is able to hold information of m bits (m≥1). An output end of the latch section 14*b* is coupled to one end of the switch section 14*c*. The latch section 14*b* outputs the information held therein as the initial value to the detector 13 (the counter section 13*b*) of corresponding one of the pixels 10 included in the column line of the next stage via the switch section 14*c*. The one end of the switch section 14*c* is coupled to the output end of the latch section 14*b*. Another end of the switch section 14*c* is coupled to the detector 13 (the input end of the rewrite circuit of the counter section 13*b*) of the corresponding one of the pixels 10 included in the column line of the next stage.

In the present modification example, the counter section 13*b* included in the detector 13 includes a digital counter of k bits (k≥1), for example. The digital counter is a digital circuit including a latch circuit and the like. The counter section 13*b* includes a circuit (a rewrite circuit) that rewrites the initial value in response to input of a signal (the rewrite signal) from the latch section 14*b* included in corresponding one of the transfer sections 14, and a circuit (the adder circuit) that adds the input signal (the addition signal) from the light pulse responder 11 to the initial value.

FIG. 31 conceptually illustrates a switching example of the counter section 13*b* for each horizontal period. In the present modification example, as illustrated in FIG. 31, for example, during one frame period, the controller 130 outputs the control signals pa to od to cause each switch section 13*a* included in the column line to sequentially select all the light pulse responders 11 included in the column line one by one.

FIG. 32 conceptually illustrates pixel data to be outputted from each counter section 13*b* included in the column line as a result of performing the switching illustrated in FIG. 31. In FIG. 32, each counter section 13*b* included in the column line outputs information (held information) corresponding to the number of photons inputted from all the light pulse responders 11 included in the column line to the transfer section 14 (in a final stage, the interface section 122) at timings with shading. The held information corresponds to the sum of a plurality of pieces of pixel data obtained from the column line. The transfer section 14 transfers the sum of the pieces of pixel data obtained from the column line of the first stage as the initial value of the detector 13 (the counter section 13*b*) of the column line of the next stage, as indicated by an arrow in FIG. 32, for example.

In this way, in the present modification example, information held in the counter section 13*b* in each column line is written as the initial value into the counter section 13*b* included in the column line of the next stage, and information obtained from the light pulse responder 11 in response to incidence of light is added to the initial value of the counter section 13*b*. Thus, information held in the counter section 13*b* after the addition is written as the initial value into the counter section 13*b* included in the column line of the next stage. As a result, it is possible to perform the addition process without performing any AD conversion process. Further, the pixel data obtained in such a manner is low-noise data, and therefore it is not necessary to perform any CDS process. It is thus possible to provide the imaging unit 100 that necessitates neither the AD conversion process nor the CDS process.

Modification Example M

In the foregoing embodiment and modification examples thereof, as illustrated in FIG. 33, for example, the solid-state imaging device 120 may include a plurality of interface sections 122. Each interface sections 122 processes data (the sum of the plurality of pieces of pixel data obtained from the column line) of corresponding one of column lines that are assigned to the respective interface sections 122. In a case where such a configuration is employed, a speed at which data of all the column lines is processed increases as compared with a case where the data of all the column lines is processed with a single interface section 122.

Modification Example N

In the foregoing embodiment and modification examples thereof, as illustrated in FIG. 34, for example, the solid-state imaging device 120 may include a pixel array section 123, a TDI adder 124, a frame memory section 125, and an interface section 126.

The pixel array section 123 includes a plurality of pixels 10C performing photoelectric conversion. The plurality of pixels 10C is disposed in a matrix form in the effective pixel region. In the solid-state imaging device 120, an imaging target object is assumed to travel at a constant speed in the column direction (the up-down direction in the sheet plane of FIG. 34) with respect to the pixel array section 123, for example.

FIG. 35 illustrates a circuit configuration example of the pixel 10C. In the present modification example, the solid-state imaging device 120 is provided with a plurality of vertical signal lines VSL assigned one to each of the plurality of pixels 10C (the column line) disposed to be aligned in the column direction. As illustrated in FIG. 35, for example, the pixel 10C includes the light pulse responder 11 and a detector 12C. The light pulse responder 11 generates a light pulse in response to incidence of light. For example, the light pulse responder 11 has a configuration similar to that in each of the foregoing embodiment and modification examples thereof.

In each pixel 10C, the detector 12C includes the switch section 12*a*, the counter section 12*b*, and a switch section 12*k*, for example. The one end of the switch section 12*a* is coupled to the signal line L1 of the light pulse responder 11. The other end of the switch section 12*a* is coupled to the input end of the counter section 12*b* (an input end of an integration circuit to be described later). The switch section 12*a* controls coupling and decoupling between the signal line L1 and the input end of the counter section 12*b*. For example, the counter section 12*b* includes a digital counter of k bits (k≥1) as illustrated in FIG. 4. The digital counter is a digital circuit including a latch circuit and the like. The counter section 12*b* includes a circuit (the integration circuit) that integrates input signals from the light pulse responder 11. The one end of the switch section 12*c* is coupled to the output end of the counter section 12*b* (an output end of the integration circuit). The other end of the switch section 12c is coupled to the vertical signal line VSL, and is coupled to the TDI adder 124 via the vertical signal line VSL.

In the present modification example, the controller 130 performs TDI control on the solid-state imaging device 120 (the plurality of pixels 10C, the TDI adder 124, the frame memory section 125, and the interface section 126). The controller 130 selects the plurality of pixels 10C (the row line) disposed to be aligned in the row direction simultaneously to thereby cause a plurality of pieces of pixel data obtained at the selected row line to be outputted to the TDI adder 124 via the plurality of vertical signal lines VSL. At this time, the controller 130 selects a plurality of row lines sequentially in predetermined cycles.

In the present modification example, the TDI adder 124, the frame memory section 125, and the interface section 126 generate image data by performing a TDI process with use of a plurality of pulse signals obtained from a plurality of sets of pixel lines (the row lines) of the plurality of pixels 10C, the plurality of sets of pixel lines being disposed to be aligned in the row direction. The TDI adder 124 acquires, via the plurality of vertical signal lines VSL, a plurality of pieces of pixel data (a plurality of pieces of pixel data of an i-th row) inputted from the row line of the i-th row selected by the controller 130. The TDI adder 124 writes the acquired pieces of pixel data of the i-th row into a memory at a predetermined row address (the i-th row) in the frame memory section 125. For example, each time the TDI adder 124 acquires a plurality of pieces of pixel data, the TDI adder 124 writes the acquired pieces of pixel data into a row address, in the frame memory section 125, at a line next to the row address into which writing has been performed last time. In a case where writing into a row address of a final row (an n-th row) has been performed last time, the TDI adder 124 writes the acquired pieces of pixel data into a memory at a first row address (the first row). The TDI adder 124 performs such a write process until a number of pieces of pixel data as many as the number of the row lines are acquired.

Each time the TDI adder 124 acquires the pixel data from all the pixels 10C in the pixel array section 123, the TDI adder 124 shifts an addition location, in the frame memory section 125, for a plurality of pieces of pixel data of an i-th row acquired thereafter by m rows (for example, one row). For example, the TDI adder 124 adds the acquired pieces of pixel data of the i-th row to a memory at a predetermined row address (i+t×m-th row) in the frame memory section 125. "t" corresponds to the number of times the pixel data has been acquired from all the pixels 10C. When t=n, the sum of the plurality of (n) pieces of pixel data obtained from the column line is stored in each memory of the frame memory section 125. When t=n, the interface section 126 acquires pixel data for one frame (that is, image data) from the frame memory section 125. The interface section 126 outputs the acquired image data to outside via the communicator 140.

Operation

Next, a description will be given of the operation of the imaging unit 100 according to the present modification example. FIG. 36 is a timing chart illustrating an example of a method of controlling the solid-state imaging device 120 according to the present modification example. The controller 130 turns on the switch section 12a of each pixel 10C by setting the control signal φ1 to High. Photons are thus inputted to the counter section 12b from the light receiving section 11b where the avalanche phenomenon occurs. Subsequently, upon a lapse of a predetermined exposure period, the controller 130 turns off the switch section 12a of each pixel 10C by setting the control signal φ1 to low. The input of the photons from the light receiving section 11b to the counter section 12b is thus stopped. At this time, at the counter section 12b, information corresponding to the number of the inputted photons is integrated, and information (held information) thereby obtained is held.

Thereafter, during a period of one exposure cycle (one scan period), the controller 130 sequentially turns on and off the switch sections 12c of the pixels 10C on a row line by row line basis by changing control signals φ3_0 to φn−1 from High to Low sequentially one by one. The counter section 12b thereby outputs the information (the held information) held in the counter section 12b to the TDI adder 124 via the switch section 12c. The TDI adder 124 writes the acquired pieces of pixel data of the i-th row into the memory at the predetermined row address (the i-th row) in the frame memory section 125. For example, each time the TDI adder 124 acquires a plurality of pieces of pixel data from the row line in which the switch section 12c is turned on and off, the TDI adder 124 writes the acquired pieces of pixel data into a row address, in the frame memory section 125, at the line next to the row address into which writing has been performed last time. In the case where writing into the row address of the final row (the n-th row) has been performed last time, the TDI adder 124 writes the acquired pieces of pixel data into the memory at the first row address (the first row). The TDI adder 124 performs such a write process until completion of turning on and off of all the switch sections 12c.

Thereafter, each time one scan period elapses, the controller 130 changes the control signal φ1 from High to Low to cause exposure to be performed at each light receiving section 11b. During each scan period, the controller 130 sequentially turns on and off the switch sections 12c of the pixels 10C on a row line by row line basis by changing the control signals φ3_0 to φn−1 from High to Low sequentially one by one. In this case, during each scan period, the TDI adder 124 shifts the addition location, in the frame memory section 125, for the acquired pieces of pixel data of the i-th row by m rows (for example, one row). For example, the TDI adder 124 adds the acquired pieces of pixel data of the i-th row to the memory at the predetermined row address (i+t×m-th row) in the frame memory section 125. When t=n, the controller 130 causes the interface section 126 to acquire pixel data for one frame (that is, image data). The controller 130 causes the interface section 126 to output the acquired image data to outside via the communicator 140.

Effects

In the present modification example, pieces of information held in the counter sections 12b in the respective pixels 10C are sequentially written into the frame memory section 125 on a row line by row line basis, and are added to the frame memory section 125 while shifting the location by m rows (for example, one row) each time one scan period elapses. This makes it possible to perform the addition process without performing any AD conversion process. Further, the pixel data obtained in such a manner is low-noise data, and therefore it is not necessary to perform any CDS process. It is thus possible to provide the imaging unit 100 that necessitates neither the AD conversion process nor the CDS process.

Modification Example O

In the foregoing embodiment and modification examples thereof, the light pulse responder 11 may include a circuit of an active precharge type as illustrated in FIG. 37, for example. The light pulse responder 11 illustrated in FIG. 37 includes the light receiving section 11b, transistors 41, 42, 43, 44, and 45, an inverter 46, and a pulse generator 47.

The pulse generator 47 includes, an internal components, a delayer D3 and a NAND circuit NP. The transistors 41, 42, and 43 are PMOS transistors. The transistors 44 and 45 are NMOS transistors. Gates of the transistors 41, 42, 44, and 45 are coupled to an output terminal of the NAND circuit NP via signal lines. Sources of the transistors 41 and 42 are coupled to a power supply line Vdd. A drain of the transistor 41 is coupled to a gate of the transistor 43, a source of the transistor 45, and one end of the light receiving section 11b (for example, a cathode of a photodiode) via signal lines. Drains of the transistors 44 and 45 are coupled to a ground line. A source of the transistor 43 is coupled to a drain of the transistor 42. A drain of the transistor 43 is coupled to an input end of the inverter 46 and a source of the transistor 44 via signal lines. An output end of the inverter 46 is coupled to the signal line L1. The delayer D3 is coupled to the signal line L1 and one of input terminals of the NAND circuit NP. Another of the input terminals of the NAND circuit NP is coupled to a terminal xRST. The pulse generator 47 is not limited to that having the above-described configuration, and may have a configuration different from the above-described configuration.

Next, a description will be given of an operation of the light pulse responder 11 according to the present modification example. When the light receiving section 11b reacts with a photon, a current between a cathode and an anode increases, a current between the source and the drain of the transistor 41 increases, and a gate voltage of the transistor 43 becomes Low due to a decrease in voltage between the source and the drain of the transistor 41. This causes both the transistors 41 and 43 to be on. Accordingly, a current flowing between the source and the drain of the transistor 42 increases. A voltage between the gate and the source of the transistor 42 thus increases due to an Id-Vgs characteristic.

That is, at substantially the same time when the transistor 43 is turned on between the source and the drain, the transistor 42 is also turned on between the gate and the source. Because both the transistor 42 and the transistor 43 are turned on, a voltage at the input end of the inverter 46 is raised to High by the power supply line Vdd. When a High voltage is inputted, the inverter 46 outputs a Low voltage to the signal line L1. In this way, in the light pulse responder 11 according to the present modification example, a Low (negative-polarity) pulse is outputted to the signal line L1 when detecting a photon.

When the voltage of the signal line L1 becomes Low, a voltage of one of the input terminals of the NAND circuit NP also becomes Low with a time lag. The NAND circuit NP thus outputs a High voltage to the gates of the transistors 44 and 55. The High voltage is applied to the gates of the transistors 44 and 55 to turn on the transistors 44 and 55 between the source and the drain. Accordingly, the cathode of the light receiving section 11b is coupled to a ground potential and the avalanche phenomenon is stopped. Thus, the light pulse responder 11 is a circuit that performs active quench.

Further, the transistor 42 is turned off between the source and the drain to suppress a through-current from the power supply to the ground. Accordingly, a voltage at the input end of the inverter 46 is initialized by a potential of the ground line to become Low. When the voltage at the input end of the inverter 46 becomes Low, the inverter 46 outputs a High voltage to the signal line L1. As a result, the voltage at the one of the input terminals of the NAND circuit NP becomes High with a time lag caused by the delayer D3. Furthermore, when a High voltage is applied to the terminal xRST, the NAND circuit NP outputs a Low voltage. At this time, the Low voltage is applied to the gate of the transistor 41, and the transistor 41 is thus turned on between the source and the drain. Accordingly, the potential at the cathode of the light receiving section 11b is raised by the voltage of the power supply line Vdd. A voltage across the light receiving section 11b becomes higher than or equal to the breakdown voltage, and the light pulse responder 11 thus becomes able to detect photons again.

In the light pulse responder 11 according to the present modification example, when a signal corresponding to a photon is outputted from the signal line L1, the cathode of the light receiving section 11b is coupled to the ground potential, which makes it possible to perform quenching at a high speed. Further, because the transistor 41 is also driven by a pulse, the cathode voltage of the light receiving section 11b is raised also in a short time as compared with a case where a current source transistor is used. Further, in the light pulse responder 11 according to the present modification example, it is possible to output pulses of a constant width to a circuit of a subsequent stage regardless of the length of a recharge time. Further, the light pulse responder 11 according to the present modification example has a favorable input/output characteristic when illuminance is high.

Modification Example P

In the foregoing embodiment and modification examples thereof, the light pulse responder 11 may include a circuit of an active recharge type as illustrated in FIG. 38, for example. The light pulse responder 11 illustrated in FIG. 38 includes the light receiving section 11b, a transistor 51, an amplifier 52, a count-value holding section 53, and a readout section 54. A circuit including the transistor 51, the amplifier 52, the count-value holding section 53, and the readout section 54 is a circuit corresponding to the quench section 11a.

A power supply voltage VR is coupled to a drain of the transistor 51, a reset pulse signal is applied to a gate of the transistor 51, and the cathode of the light receiving section 11b is coupled to a source of the transistor 51. The anode of the light receiving section 11b is coupled to the ground line. The cathode of the light receiving section 11b is coupled to an input terminal of the amplifier 52, and an output terminal of the amplifier 52 is coupled to one of input terminals (a clock input terminal) of the count-value holding section 53. An initial setting pulse signal is applied to another of the input terminals (an initial setting terminal) of the count-value holding section 53.

Upon incidence of a photon on the light receiving section 11b when the transistor 51 is off, a cathode potential of the light receiving section 11b decreases due to photoelectric conversion action. Thereafter, when the transistor 51 is turned on by the reset pulse signal applied to the gate of the transistor 51, the cathode potential of the light receiving section 11b increases to the power supply voltage VR. The increase change to the power supply voltage VR is amplified by the amplifier 52 and inputted to the count-value holding section 53.

The count-value holding section 53 holds a value resulting from counting pulses obtained from the amplifier 52 in the following manner. For example, the reset pulse signal is applied to the transistor 51 with any given cycle. In contrast, assume that a plurality of incident photons are incident on the light receiving section 11b during a period (a measurement period) longer than the cycle of the reset pulse signal. In this case, if the measurement period is divided in accordance with the cycle of the reset pulse signal, presence/absence information of the incident photons is obtainable for each section. The presence/absence information of the incident photons is information regarding whether or not any reset pulse signal is present, and not regarding how many reset pulse signals are present. In a section without any incident photons, no pulse is outputted from the amplifier 52 even if the transistor 51 is turned on. Therefore, in a case where one or more incident photons are present, a count value at the count-value holding section 53 is a value obtained by adding 1 to a count value that has been held so far. In a case without any incident photons, a count value at the count-value holding section 53 remains the same as the count value that has been held so far. Upon a lapse of a predetermined period (for example, 1/60 sec, 1/120 sec, or the like), the readout section 54 reads the count value held in the count-value holding section 53 from the count-value holding section 53 and outputs the count value to the detector 12.

In the present modification example, photons are counted at the light pulse responder 11 by periodic resetting. This causes a count-value output to be asymptotic, thus making it possible to expand a range over which a monotonous increase characteristic of the count-value output is retainable no matter how much the amount of incident light increases. As a result, it is possible to obtain a dynamic range greater than or equal to the number of bits of the count-value holding section 53.

It is to be noted that in the foregoing embodiment and modification examples thereof, the light pulse responder 11 may include a circuit of a passive recharge type.

Modification Example Q

In the foregoing embodiment and modification examples thereof, a plurality of light receiving sections 11b included in the column lines of the pixel array sections 121 and 123 may be configured to detect light in wavelength bands common to each other. In the foregoing embodiment and modification examples thereof, the plurality of light receiving sections 11b included in the column lines of the pixel array sections 121 and 123 may include color filters that transmit light in wavelength bands common to each other on light incidence surfaces of photodiodes. In a case where such a configuration is employed, it is possible for the interface sections 122 and 126 to obtain a sum of a plurality of pieces of pixel data of the same color on a column line by column line basis.

Here, when three column lines are taken as a column line group as one set in the pixel array sections 121 and 123, the light receiving sections 11b included in a first one of the column lines may be configured to detect red light, the light receiving sections 11b included in a second one of the column lines may be configured to detect green light, and the light receiving sections 11b included in a third one of the column lines may be configured to detect blue light, in each of the column line groups. In a case where such a configuration is employed, it is possible for the interface sections 122 and 126 to obtain a sum of pieces of pixel data of a red color, a sum of pieces of pixel data of a green color, and a sum of pieces of pixel data of a blue color on a column line group by column line group basis. As a result, it is possible for the interface sections 122 and 126 to generate and output image data displayable in color.

3. Application Examples

Next, a description will be given of application examples of the imaging unit 100 according to any of the foregoing embodiment and modification examples thereof (hereinafter simply referred to as the "imaging unit 100").

Application Example 1

FIG. 34 illustrates a schematic configuration example of FA (factory automation) using the imaging unit 100. In FA, the imaging unit 100 is disposed near a conveyance unit 300 including a belt conveyor, and captures an image of a predetermined imaging region of the belt conveyor. In the imaging region, a plurality of articles is moved by the belt conveyor in a moving direction of the belt conveyor. The imaging unit 100 outputs image data obtained by imaging to a signal processor 200. On the basis of the image data inputted from the imaging unit 100, the signal processor 200 performs an inspection on the articles included in the image data for presence or absence of a defect and a like. By applying the imaging unit 100 to FA in this way, limitation to a conveyance speed of the belt conveyor is mitigated, which makes it possible to improve inspection speed.

Application Example 2

FIG. 35 illustrates a schematic configuration example of a biological sample analysis apparatus 6100 in which the imaging unit 100 is used in a detector 6102 to be described later.

The biological sample analysis apparatus 6100 illustrated in FIG. 35 includes a light irradiator 6101 that irradiates a biological sample S flowing through a flow channel C with light, the detector 6102 that detects light resulting from irradiating the biological sample S with light, and an information processor 6103 that processes information regarding the light detected by the detector 6102. Examples of the biological sample analysis apparatus 6100 may include a flow cytometer and an imaging cytometer. The biological sample analysis apparatus 6100 may include a sorting section 6104 that performs sorting of predetermined biological particles P in the biological sample S. Examples of the biological sample analysis apparatus 6100 including the sorting section 6104 may include a cell sorter.

(Biological Sample)

The biological sample S may be a liquid sample including the biological particles P. The biological particles P are, for example, cells or non-cellular biological particles. The cells may be living cells. More specific examples of the cells may include blood cells including red blood cells and white blood cells, and germ cells including sperm and fertilized eggs. The cells may be directly collected from a specimen such as whole blood, or may be cultured cells acquired after culture. Specific examples of the non-cellular biological particles may include extracellular vesicles, and particularly, exosomes and microvesicles. The biological particles P may be labeled with one or more labeling agents (e.g., pigments (particularly, fluorochromes), fluorochrome-labeled antibodies, or the like). It is to be noted that the biological sample analysis apparatus according to the present disclosure may analyze particles other than the biological particles P, or may analyze beads or the like for calibration or the like.

(Flow Channel)

The flow channel C is configured to allow the biological sample S to flow therethrough. In particular, the flow channel C may be configured to form a flow in which the biological particles P included in the biological sample S are substantially in a line. A flow channel structure including the flow channel C may be designed to form a laminar flow. In particular, the flow channel structure is designed to form a laminar flow in which a flow of the biological sample S (a sample flow) is enclosed by a flow of a sheath liquid. The design of the flow channel structure may be appropriately selected by a person of ordinary skill in the art, and a known design may be employed. The flow channel C may be formed within a flow channel structure (flow channel structure) such as a microchip (a chip having a flow channel of the order of micrometers) or a flow cell. A width of the flow channel C is 1 mm or less, and may be, in particular, 10 μm or more and 1 mm or less. The flow channel C and the flow channel structure including the flow channel C may include a material such as plastic or glass.

The biological sample analysis apparatus 6100 is configured to cause the biological sample S flowing in the flow channel C and, in particular, the biological particles P in the biological sample S, to be irradiated with light from the light irradiator 6101. The biological sample analysis apparatus 6100 may be configured to allow an interrogation point (interrogation point) of the light on the biological sample S to be inside the flow channel structure in which the flow channel C is formed, or may be configured to allow the interrogation point of the light to be outside the flow channel structure. Examples of the former may include a configuration in which the flow channel C in the microchip or the flow cell is irradiated with the light. In the latter case, the biological particles P after exiting the flow channel structure (in particular, a nozzle portion thereof) may be irradiated with the light, and examples thereof may include a Jet-in-Air flow cytometer.

(Light Irradiator)

The light irradiator 6101 includes a light source section that emits light, and a guiding optical system that guides the light to the interrogation point. The light source section includes one or more light sources. Examples of the kind of the light source may include a laser light source and an LED. Light emitted from each light source may have a wavelength of any of ultraviolet light, visible light, and infrared light. The guiding optical system includes an optical component such as a beam splitter group, a mirror group, or an optical fiber. Further, the guiding optical system may include a lens group for condensing light, and may include an objective lens, for example. The number of interrogation points where the biological sample and light intersect with each other may be one or more. The light irradiator 6101 may be configured to concentrate light emitted from one light source or a plurality of different light sources onto one interrogation point.

(Detector)

The detector 6102 includes at least one photodetector that detects light generated by irradiation of the biological particles P with light. The light to be detected is, for example, fluorescence or scattered light (e.g., one or more of forward scattered light, back scattered light, and side scattered light). Each photodetector includes one or more light receiving devices, and has a light receiving device array, for example. Each photodetector may include, as the light receiving device, one or more PMTs (photomultiplier tubes) and/or photodiodes such as APDs or MPPCs. The photodetector includes, for example, a PMT array in which a plurality of PMTs are arranged in a one-dimensional direction. Further, the detector 6102 may include an imaging device such as a CCD or a CMOS. Using the imaging device, the detector 6102 may acquire an image (for example, a bright-field image, a dark-field image, a fluorescent image, or the like) of the biological particles P.

The detector 6102 includes a detecting optical system that causes light of a predetermined detection wavelength to reach a corresponding photodetector. The detecting optical system includes a spectroscopic section such as a prism or a diffraction grating, or a wavelength separator such as a dichroic mirror or an optical filter. The detecting optical system is configured to, for example, spectrally disperse light generated by irradiation of the biological particles P with light and to cause the spectrally dispersed light to be detected by a plurality of photodetectors of which number is larger than the number of fluorochromes with which the biological particles P are labeled. A flow cytometer including such a detecting optical system is called a spectral flow cytometer. Further, the detecting optical system is configured to, for example, separate light corresponding to a fluorescent wavelength region of a specific fluorochrome from the light generated by irradiation of the biological particles P with light and to cause the separated light to be detected by a corresponding photodetector.

Further, the detector 6102 may include a signal processor that converts an electric signal obtained by the photodetector into a digital signal. The signal processor may include an AD converter as an apparatus that performs the conversion. The digital signal obtained by the conversion by the signal processor may be transmitted to the information processor 6103. The digital signal may be handled by the information processor 6103 as data related to light (hereinafter, also referred to as "optical data"). The optical data may be optical data including, for example, fluorescence data. More specifically, the optical data may be light intensity data, and the light intensity may be light intensity data (which may include a feature quantity such as Area, Height, Width, or the like) of light including fluorescence.

(Information Processor)

The information processor 6103 includes, for example, a processor that executes processing of various kinds of data (e.g., optical data) and a storage that holds the various kinds of data. In a case where optical data corresponding to a fluorochrome is acquired from the detector 6102, the processor may perform fluorescence leakage correction (a compensation process) on the light intensity data. Further, in a case of a spectral flow cytometer, the processor executes a fluorescence separation process on the optical data and acquires light intensity data corresponding to the fluorochrome. The fluorescence separation process may be performed in accordance with, for example, an unmixing method described in Japanese Unexamined Patent Application Publication No. 2011-232259. In a case where the detector 6102 includes an imaging device, the processor may acquire morphological information of the biological particles on the basis of an image acquired by the imaging device. The storage may be configured to hold acquired optical data. The storage may be further configured to hold spectral reference data to be used in the unmixing process.

In a case where the biological sample analysis apparatus 6100 includes the sorting section 6104 to be described later, the information processor 6103 may, on the basis of the optical data and/or the morphological information, execute a determination as to whether or not the biological particles P are to be sorted. Thereafter, the information processor 6103 may control the sorting section 6104 on the basis of a result of the determination, and sorting of the biological particles P by the sorting section 6104 may be performed.

The information processor 6103 may be configured to output various kinds of data (e.g., optical data and images). For example, the information processor 6103 may output various kinds of data (e.g., a two-dimensional plot, a spectral plot, and the like) generated on the basis of the optical data. Further, the information processor 6103 may be configured to accept input of various kinds of data, and accepts, for example, a gating process by a user on a plot. The information processor 6103 may include an output section (e.g., a display or the like) or an input section (e.g., a keyboard or the like) allowing for execution of the output or the input.

The information processor 6103 may be configured as a general-purpose computer, and may be configured as, for example, an information processing apparatus including a CPU, a RAM, and a ROM. The information processor 6103 may be contained inside a housing in which the light irradiator 6101 and the detector 6102 are provided, or may be outside the housing. Further, various kinds of processing or functions to be performed by the information processor 6103 may be implemented by a server computer or the cloud coupled via a network.

(Sorting Section)

The sorting section 6104 executes sorting of the biological particles P on the basis of the result of determination by the information processor 6103. A method of sorting may be a method including generating droplets containing the biological particles by vibration, applying electric charge to the droplet to be sorted, and controlling a traveling direction of the droplet by means of an electrode. The method of sorting may be a method in which sorting is performed by controlling the traveling direction of the biological particles P in the flow channel structure. The flow channel structure is provided with, for example, a control mechanism that uses pressure (injection or suction) or electric charge. Examples of the flow channel structure may include a chip (for example, a chip described in Japanese Unexamined Patent Application Publication No. 2020-76736) in which the flow channel C has a flow channel structure where the flow channel C branches to a recovery flow channel and a waste liquid flow channel on a downstream side thereof and in which specific biological particles are recovered into the recovery flow channel.

Although the present disclosure has been described hereinabove with reference to the embodiment, the modification examples thereof, and the application examples thereof, the present disclosure is not limited to the foregoing embodiment and the like, and may be modified in a variety of ways. It is to be noted that the effects described herein are mere examples. The effects of the present disclosure are not limited to the effects described herein. The present disclosure may have effects other than the effects described herein.

In addition, for example, the present disclosure may have the following configurations.

(1)
An imaging unit including:
a plurality of pixels disposed in a matrix form; and
a controller that performs TDI (Time Delay Integration) control on the plurality of pixels, in which
each of the pixels includes
a light pulse responder that generates a light pulse in response to incidence of light, and
a counter section including a rewrite circuit and an adder circuit, the rewrite circuit rewriting an initial value, the adder circuit adding information corresponding to the light pulse to the initial value, and
the controller causes information held in the counter section to be written as the initial value into the counter section included in the pixel of a next stage in a column direction, and thereafter causes the information corresponding to the light pulse obtained from the light pulse responder to be added to the initial value.

(2)
The imaging unit according to (1), in which the counter section includes a digital counter of k bits ($k \geq 1$).

(3)
The imaging unit according to (2), in which
each of the pixels further includes a latch section that holds information inputted from the counter section, and
the controller causes the information inputted from the counter section and held in the latch section to be written as the initial value into the counter section included in the pixel of the next stage in the column direction.

(4)
The imaging unit according to (3), in which
the counter section includes a plurality of flip-flops on a bit-by-bit basis, and
one of the plurality of flip-flops provided on the bit-by-bit basis also serves as the latch section.

(5)
The imaging unit according to any one of (2) to (4), in which a higher-order bit of the counter section is formed outside a region where the plurality of pixels is formed in the matrix form.

(6)
The imaging unit according to any one of (2) to (5), in which the bits of the counter section are larger in number at a later stage in the column direction than at an initial stage in the column direction.

(7)
The imaging unit according to any one of (1) to (6), in which
each of the pixels includes two of the counter sections, and
the controller causes the information held in a first counter section that is one of the counter sections to be written as the initial value into the first counter section included in the pixel of the next stage in the column direction, and while doing so, causes the information held in a second counter section that is another of the counter sections to be written as the initial value into the second counter section included in the pixel of the next stage in the column direction.

(8)
The imaging unit according to any one of (1) to (7), in which a device that ameliorates waveform rounding of a control signal to be inputted from the controller to the plurality of pixels is inserted to a wiring line through which the control signal propagates.

(9)
The imaging unit according to any one of (1) to (8), in which each of the pixels further includes a determination section, the determination section making a determination as to whether or not the counter section is saturated, and performing, when a result of the determination is that the counter section is saturated, control of causing the counter section to add information corresponding to a clock to the initial value, instead of the information corresponding to the light pulse.

(10)
  The imaging unit according to any one of (1) to (8), in which each of the pixels further includes a determination section, the determination section making a determination as to whether or not the counter section is saturated, and performing, when a result of the determination is that the counter section is saturated, control of causing the counter section to record a time code at that time.

(11)
  An imaging unit including:
  a plurality of pixels disposed in a matrix form; and
  a controller that performs TDI (Time Delay Integration) control on the plurality of pixels, in which
  each of the pixels includes
    a light pulse responder that generates a light pulse in response to incidence of light,
    a switch section that couples one of input terminals and one output terminal to each other, a number of the input terminals being equal to a number of the pixels included in a column line, and
    a counter section that integrates pieces of information corresponding to the light pulses obtained from all the light pulse responders included in the column line via the switch section, and
  the controller causes the switch section to sequentially select all the light pulse responders included in the column line one by one, and thereby causes the counter section to integrate the pieces of information corresponding to the light pulses obtained from all the light pulse responders.

(12)
  The imaging unit according to (11), in which the counter section includes a digital counter.

(13)
  The imaging unit according to (11) or (12), in which a higher-order bit of the counter section is formed outside a region where the plurality of pixels is formed in the matrix form.

(14)
  The imaging unit according to any one of (11) to (13), in which a device that ameliorates waveform rounding of a control signal to be inputted from the controller to the plurality of pixels is inserted to a wiring line through which the control signal propagates.

(15)
  The imaging unit according to any one of (11) to (14), in which each of the pixels further includes a determination section, the determination section making a determination as to whether or not the counter section is saturated, and performing, when a result of the determination is that the counter section is saturated, control of causing the counter section to add information corresponding to a clock to the initial value, instead of the information corresponding to the light pulse.

(16)
  The imaging unit according to any one of (11) to (14), in which each of the pixels further includes a determination section, the determination section making a determination as to whether or not the counter section is saturated, and performing, when a result of the determination is that the counter section is saturated, control of causing the counter section to record a time code at that time.

(17)
  An imaging unit including:
  a plurality of pixels disposed in a matrix form; and
  a generator that generates image data by performing a TDI (Time Delay Integration) process with use of information obtained from a plurality of sets of pixel lines of the plurality of pixels, the plurality of sets of pixel lines being disposed to be aligned in a row direction, in which
  each of the pixels includes
  a light pulse responder that generates a light pulse in response to incidence of light, and
  a counter section that integrates information corresponding to the light pulse obtained from the light pulse responder.

(18)
  The imaging unit according to (17), in which the counter section includes a digital counter.

(19)
  The imaging unit according to any one of (1) to (10), in which the plurality of pixels included in a column line is configured to detect light in wavelength bands common to each other.

(20)
  The imaging unit according to (19), in which, when three of the column lines are taken as a column line group as one set, the plurality of pixels included in a first one of the column lines is configured to detect red light, the plurality of pixels included in a second one of the column lines is configured to detect green light, and the plurality of pixels included in a third one of the column lines is configured to detect blue light, in each of the column line groups.

(21)
  The imaging unit according to any one of (11) to (16), in which the plurality of pixels included in the column line is configured to detect light in wavelength bands common to each other.

(22)
  The imaging unit according to (21), in which, when three of the column lines are taken as a column line group as one set, the plurality of pixels included in a first one of the column lines is configured to detect red light, the plurality of pixels included in a second one of the column lines is configured to detect green light, and the plurality of pixels included in a third one of the column lines is configured to detect blue light, in each of the column line groups.

(23)
  The imaging unit according to (17) or (18), in which the plurality of pixels included in a column line is configured to detect light in wavelength bands common to each other.

(24)
  The imaging unit according to (23), in which, when three of the column lines are taken as a column line group as one set, the plurality of pixels included in a first one of the column lines is configured to detect red light, the plurality of pixels included in a second one of the column lines is configured to detect green light, and the plurality of pixels included in a third one of the column lines is configured to detect blue light, in each of the column line groups.

(25)
An information processing system including:
an imaging unit that acquires image data by imaging; and
a processor that processes the image data acquired by the imaging unit,
the imaging unit including
a plurality of pixels disposed in a matrix form,
a controller that performs TDI (Time Delay Integration) control on the plurality of pixels, and
an output section that outputs the image data obtained by the TDI control to the processor, in which
each of the pixels includes
a light pulse responder that generates a light pulse in response to incidence of light, and
a counter section including a rewrite circuit and an adder circuit, the rewrite circuit rewriting an initial value, the adder circuit adding information corresponding to the light pulse to the initial value, and
the controller causes information held in the counter section to be written as the initial value into the counter section included in the pixel of a next stage in a column direction, and thereafter causes the information corresponding to the light pulse obtained from the light pulse responder to be added to the initial value.

(26)
An information processing system including:
an imaging unit that acquires image data by imaging; and
a processor that processes the image data acquired by the imaging unit,
the imaging unit including
a plurality of pixels disposed in a matrix form,
a controller that performs TDI (Time Delay Integration) control on the plurality of pixels, and
an output section that outputs the image data obtained by the TDI control to the processor, in which
each of the pixels includes
a light pulse responder that generates a light pulse in response to incidence of light,
a switch section that couples one of input terminals and one output terminal to each other, a number of the input terminals being equal to a number of the pixels included in a column line, and
a counter section that integrates pieces of information corresponding to the light pulses obtained from all the light pulse responders included in the column line via the switch section, and
the controller causes the switch section to sequentially select all the light pulse responders included in the column line one by one, and thereby causes the counter section to integrate the pieces of information corresponding to the light pulses obtained from all the light pulse responders.

(27)
An information processing system including:
an imaging unit that acquires image data by imaging; and
a processor that processes the image data acquired by the imaging unit,
the imaging unit including
a plurality of pixels disposed in a matrix form, and
a generator that generates the image data by performing a TDI (Time Delay Integration) process with use of information obtained from a plurality of sets of pixel lines of the plurality of pixels, the plurality of sets of pixel lines being disposed to be aligned in a row direction, in which
each of the pixels includes
a light pulse responder that generates a light pulse in response to incidence of light, and
a counter section that integrates information corresponding to the light pulse obtained from the light pulse responder.

In the imaging unit according to the first aspect of the present disclosure and the information processing system according to the second aspect of the present disclosure, in each of the pixels, the information held in the counter section is written as the initial value into the counter section included in the pixel of the next stage in the column direction, and thereafter the information corresponding to the light pulse obtained by the light pulse responder is added to the initial value. Thus, the information held in the counter section after the addition is written as the initial value into the counter section included in the pixel of the next stage in the column direction. As a result, it is possible to perform the addition process without performing any AD conversion process. Further, the pixel data obtained in such a manner is low-noise data, and therefore it is not necessary to perform any CDS process. Accordingly, it is possible to provide the imaging unit that necessitates neither the AD conversion process nor the CDS process.

In the imaging unit according to the third aspect of the present disclosure and the information processing system according to the fourth aspect of the present disclosure, the switch section sequentially selects all the light pulse responders included in the column line one by one, and the counter section thus integrates the pieces of information corresponding to the light pulses obtained from all the light pulse responders. As a result, it is possible to perform the addition process without performing any AD conversion process. Further, the pixel data obtained in such a manner is low-noise data, and therefore it is not necessary to perform any CDS process. Accordingly, it is possible to provide the imaging unit that necessitates neither the AD conversion process nor the CDS process.

In the imaging unit according to the fifth aspect of the present disclosure and the information processing system according to the sixth aspect of the present disclosure, image data is generated by integrating the information corresponding to the light pulse obtained from the light pulse responder in each of the pixels and performing the TDI process with use of the information (an integrated value) obtained from a plurality of sets of pixel lines of the plurality of pixels, the plurality of sets of pixel lines being disposed to be aligned in the row direction. As a result, it is possible to perform the TDI process without performing any AD conversion process. Further, pixel data obtained in such a manner is low-noise data, and therefore it is not necessary to perform any CDS process. Accordingly, it is possible to provide the imaging unit that necessitates neither the AD conversion process nor the CDS process. It is to be noted that the effects of the present disclosure are not necessarily limited to the effects described here and may include any of the effects described herein.

This application claims the benefit of Japanese Priority Patent Application JP2021-110226 filed with the Japan Patent Office on Jul. 1, 2021, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging unit, comprising:
a plurality of pixels disposed in a matrix form; and
a controller that performs TDI (Time Delay Integration) control on the plurality of pixels, wherein
each of the plurality of pixels includes
a light pulse responder that generates a light pulse in response to incidence of light, and
a counter section including a rewrite circuit and an adder circuit, the rewrite circuit rewriting an initial value, the adder circuit adding information corresponding to the light pulse to the initial value, and
the controller causes information held in the counter section to be written as the initial value into the counter section included in a pixel of a next stage in a column direction, and thereafter causes the information corresponding to the light pulse obtained from the light pulse responder to be added to the initial value.

2. The imaging unit according to claim 1, wherein the counter section comprises a digital counter of k bits (k≥1).

3. The imaging unit according to claim 2, wherein
each of the plurality of pixels further includes a latch section that holds information inputted from the counter section, and
the controller causes the information inputted from the counter section and held in the latch section to be written as the initial value into the counter section included in the pixel of the next stage in the column direction.

4. The imaging unit according to claim 3, wherein
the counter section includes a plurality of flip-flops on a bit-by-bit basis, and
one of the plurality of flip-flops provided on the bit-by-bit basis also serves as the latch section.

5. The imaging unit according to claim 2, wherein a higher-order bit of the counter section is formed outside a region where the plurality of pixels is formed in the matrix form.

6. The imaging unit according to claim 2, wherein the bits of the counter section are larger in number at a later stage in the column direction than at an initial stage in the column direction.

7. The imaging unit according to claim 1, wherein
each of the plurality of pixels includes two counter sections, and
the controller causes the information held in a first counter section that is one of the counter sections to be written as the initial value into the first counter section included in the pixel of the next stage in the column direction, and while doing so, causes the information held in a second counter section that is another of the counter sections to be written as the initial value into the second counter section included in the pixel of the next stage in the column direction.

8. The imaging unit according to claim 1, wherein a device that ameliorates waveform rounding of a control signal to be inputted from the controller to the plurality of pixels is inserted to a wiring line through which the control signal propagates.

9. The imaging unit according to claim 1, wherein each of the plurality of pixels further includes a determination section, the determination section making a determination as to whether or not the counter section is saturated, and performing, when a result of the determination is that the counter section is saturated, control of causing the counter section to add information corresponding to a clock to the initial value, instead of the information corresponding to the light pulse.

10. The imaging unit according to claim 1, wherein each of the plurality of pixels further includes a determination section, the determination section making a determination as to whether or not the counter section is saturated, and performing, when a result of the determination is that the counter section is saturated, control of causing the counter section to record a time code at that time.

11. An imaging unit comprising:
a plurality of pixels disposed in a matrix form; and
a controller that performs TDI (Time Delay Integration) control on the plurality of pixels, wherein
each of the plurality of pixels includes
a light pulse responder that generates a light pulse in response to incidence of light,
a switch section that couples one of input terminals and one output terminal to each other, a number of the input terminals being equal to a number of the plurality of pixels included in a column line, and
a counter section that integrates pieces of information corresponding to light pulses obtained from all light pulse responders included in the column line via the switch section, and
the controller causes the switch section to sequentially select all the light pulse responders included in the column line one by one, and thereby causes the counter section to integrate the pieces of information corresponding to the light pulses obtained from all the light pulse responders.

12. The imaging unit according to claim 11, wherein the counter section comprises a digital counter.

13. The imaging unit according to claim 11, wherein a higher-order bit of the counter section is formed outside a region where the plurality of pixels is formed in the matrix form.

14. The imaging unit according to claim 11, wherein a device that ameliorates waveform rounding of a control signal to be inputted from the controller to the plurality of pixels is inserted to a wiring line through which the control signal propagates.

15. The imaging unit according to claim 11, wherein each of the plurality of pixels further includes a determination section, the determination section making a determination as to whether or not the counter section is saturated, and performing, when a result of the determination is that the counter section is saturated, control of causing the counter section to add information corresponding to a clock to an initial value, instead of the information corresponding to the light pulse.

16. The imaging unit according to claim 11, wherein each of the plurality of pixels further includes a determination section, the determination section making a determination as to whether or not the counter section is saturated, and performing, when a result of the determination is that the counter section is saturated, control of causing the counter section to record a time code at that time.

17. An imaging unit comprising:
a plurality of pixels disposed in a matrix form; and
a generator that generates image data by performing a TDI (Time Delay Integration) process with use of information obtained from a plurality of sets of pixel lines of the plurality of pixels, the plurality of sets of pixel lines being disposed to be aligned in a row direction, wherein each of the plurality of pixels includes
a light pulse responder that generates a light pulse in response to incidence of light, and
a counter section that integrates information corresponding to the light pulse obtained from the light pulse responder.

18. The imaging unit according to claim 17, wherein the counter section comprises a digital counter.

19. The imaging unit according to claim 1, wherein the plurality of pixels included in a column line is configured to detect light in wavelength bands common to each other.

20. The imaging unit according to claim 19, wherein, when three of column lines are taken as a column line group as one set, the plurality of pixels included in a first one of the column lines is configured to detect red light, the plurality of pixels included in a second one of the column lines is configured to detect green light, and the plurality of pixels included in a third one of the column lines is configured to detect blue light, in each of column line groups.

21. The imaging unit according to claim 11, wherein the plurality of pixels included in the column line is configured to detect light in wavelength bands common to each other.

22. The imaging unit according to claim 21, wherein, when three of column lines are taken as a column line group as one set, the plurality of pixels included in a first one of the column lines is configured to detect red light, the plurality of pixels included in a second one of the column lines is configured to detect green light, and the plurality of pixels included in a third one of the column lines is configured to detect blue light, in each of column line groups.

23. The imaging unit according to claim 17, wherein the plurality of pixels included in a column line is configured to detect light in wavelength bands common to each other.

24. The imaging unit according to claim 23, wherein, when three of column lines are taken as a column line group as one set, the plurality of pixels included in a first one of the column lines is configured to detect red light, the plurality of pixels included in a second one of the column lines is configured to detect green light, and the plurality of pixels included in a third one of the column lines is configured to detect blue light, in each of column line groups.

25. An information processing system comprising:
an imaging unit that acquires image data by imaging; and
a processor that processes the image data acquired by the imaging unit,
the imaging unit including
a plurality of pixels disposed in a matrix form,
a controller that performs TDI (Time Delay Integration) control on the plurality of pixels, and
an output section that outputs the image data obtained by the TDI control to the processor, wherein
each of the plurality of pixels includes
a light pulse responder that generates a light pulse in response to incidence of light, and
a counter section including a rewrite circuit and an adder circuit, the rewrite circuit rewriting an initial value, the adder circuit adding information corresponding to the light pulse to the initial value, and
the controller causes information held in the counter section to be written as the initial value into the counter section included in a pixel of a next stage in a column direction, and thereafter causes the information corresponding to the light pulse obtained from the light pulse responder to be added to the initial value.

26. An information processing system comprising:
an imaging unit that acquires image data by imaging; and
a processor that processes the image data acquired by the imaging unit,
the imaging unit including
a plurality of pixels disposed in a matrix form,
a controller that performs TDI (Time Delay Integration) control on the plurality of pixels, and
an output section that outputs the image data obtained by the TDI control to the processor, wherein
each of the plurality of pixels includes
a light pulse responder that generates a light pulse in response to incidence of light,
a switch section that couples one of input terminals and one output terminal to each other, a number of the input terminals being equal to a number of the plurality of pixels included in a column line, and
a counter section that integrates pieces of information corresponding to light pulses obtained from all light pulse responders included in the column line via the switch section, and
the controller causes the switch section to sequentially select all the light pulse responders included in the column line one by one, and thereby causes the counter section to integrate the pieces of information corresponding to the light pulses obtained from all the light pulse responders.

27. An information processing system comprising:
an imaging unit that acquires image data by imaging; and
a processor that processes the image data acquired by the imaging unit,
the imaging unit including
a plurality of pixels disposed in a matrix form, and
a generator that generates the image data by performing a TDI (Time Delay Integration) process with use of information obtained from a plurality of sets of pixel lines of the plurality of pixels, the plurality of sets of pixel lines being disposed to be aligned in a row direction, wherein
each of the plurality of pixels includes
a light pulse responder that generates a light pulse in response to incidence of light, and
a counter section that integrates information corresponding to the light pulse obtained from the light pulse responder.

\* \* \* \* \*